United States Patent
Rhee et al.

(10) Patent No.: US 8,271,058 B2
(45) Date of Patent: *Sep. 18, 2012

(54) COMMUNICATING OVER A WIRELESS NETWORK

(75) Inventors: Sokwoo Rhee, Lexington, MA (US); Sheng Liu, Cambridge, MA (US)

(73) Assignee: Millennial Net, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,286

(22) Filed: Oct. 21, 2010

(65) Prior Publication Data

US 2011/0045875 A1 Feb. 24, 2011

Related U.S. Application Data

(63) Continuation of application No. 11/443,869, filed on May 31, 2006, now Pat. No. 7,844,308.

(60) Provisional application No. 60/686,127, filed on Jun. 1, 2005, provisional application No. 60/724,343, filed on Oct. 6, 2005.

(51) Int. Cl.
  *H04M 1/00* (2006.01)
  *H04B 1/38* (2006.01)
  *H04B 1/16* (2006.01)
  *H04B 1/00* (2006.01)

(52) U.S. Cl. ............ 455/574; 455/572; 455/343.2; 455/343.4; 375/132

(58) Field of Classification Search .............. 455/571, 455/572, 574, 41.2, 127.5, 343.2, 343.4, 455/343.5; 375/132
See application file for complete search history.

(56) References Cited

U.S. PATENT DOCUMENTS

| | | | |
|---|---|---|---|
| 4,358,823 A | 11/1982 | McDonald et al. |
| 5,128,928 A | 7/1992 | Wilder et al. |
| 5,194,860 A | 3/1993 | Jones et al. |
| 5,257,372 A | 10/1993 | Furtney et al. |
| 5,355,371 A | 10/1994 | Auerbach et al. |
| 5,428,636 A | 6/1995 | Meier |
| 5,491,787 A | 2/1996 | Hashemi |

(Continued)

FOREIGN PATENT DOCUMENTS

EP   0 650 279   4/1995

(Continued)

OTHER PUBLICATIONS

Gerla et al., "Landmark Routing for Large Ad Hoc Wireless Networks", Global Telecom. Conf., IEEE v.3, pp. 1702-1706 (2000).

(Continued)

*Primary Examiner* — Andrew Wendell
(74) *Attorney, Agent, or Firm* — Pierce Atwood LLP; Joseph M. Maraia

(57) ABSTRACT

A first device communicates with a wireless network that includes nodes that are active for predefined activation times and that are at least partially dormant when not active. The communication method includes identifying a start of communication via a message that exceeds a maximum activation time of nodes on the wireless network by a factor N, where N is equal to at least a maximum number of frequencies on the wireless network, and exchanging information with a second device comprising a node on the wireless network that is within a transmission range of the first device, where the information is exchanged following the message and includes frequency hopping data for the second device.

25 Claims, 12 Drawing Sheets

U.S. PATENT DOCUMENTS

| | | | |
|---|---|---|---|
| 5,497,368 | A | 3/1996 | Reijnierse et al. |
| 5,608,721 | A | 3/1997 | Natarajan et al. |
| 5,654,959 | A | 8/1997 | Baker et al. |
| 5,719,861 | A | 2/1998 | Okanoue |
| 5,729,680 | A | 3/1998 | Belanger et al. |
| 5,790,817 | A | 8/1998 | Asghar et al. |
| 5,809,222 | A | 9/1998 | Kizu |
| 5,815,692 | A | 9/1998 | McDermott |
| 5,854,994 | A | 12/1998 | Canada et al. |
| 6,028,857 | A | 2/2000 | Poor |
| 6,058,106 | A | 5/2000 | Cudak et al. |
| 6,078,819 | A | 6/2000 | Ciccone et al. |
| 6,192,230 | B1 | 2/2001 | van Bokhorst et al. |
| 6,208,247 | B1 | 3/2001 | Agre et al. |
| 6,229,989 | B1 | 5/2001 | Kwon |
| 6,272,537 | B1 | 8/2001 | Kekic et al. |
| 6,275,477 | B1 | 8/2001 | Trompower et al. |
| 6,285,892 | B1 | 9/2001 | Hulyalkar |
| 6,292,508 | B1 | 9/2001 | Hong et al. |
| 6,330,250 | B1 | 12/2001 | Curry et al. |
| 6,381,250 | B1 | 4/2002 | Jacobson et al. |
| 6,414,955 | B1 | 7/2002 | Clare et al. |
| 6,415,330 | B1 | 7/2002 | Okanoue |
| 6,426,959 | B1 | 7/2002 | Jacobson et al. |
| 6,427,066 | B1 | 7/2002 | Grube |
| 6,437,692 | B1 | 8/2002 | Petite et al. |
| 6,502,206 | B1 | 12/2002 | Kosuge et al. |
| 6,804,790 | B2 | 10/2004 | Rhee |
| 6,973,023 | B1 * | 12/2005 | Saleh et al. ............... 370/217 |
| 7,245,631 | B2 * | 7/2007 | Sano et al. ............... 370/463 |
| 7,369,518 | B2 | 5/2008 | Lee |
| 7,573,865 | B2 * | 8/2009 | Shvodian ............... 370/350 |
| 7,668,127 | B2 | 2/2010 | Krishnamurthy et al. |
| 7,844,308 | B2 * | 11/2010 | Rhee et al. ............... 455/574 |
| 2001/0003191 | A1 | 6/2001 | Kovacs et al. |
| 2002/0012320 | A1 | 1/2002 | Olgier et al. |
| 2002/0018448 | A1 | 2/2002 | Amis et al. |
| 2002/0027894 | A1 | 3/2002 | Arrakoski et al. |
| 2002/0036987 | A1 | 3/2002 | Garcia-Luna-Aceves et al. |
| 2002/0059434 | A1 | 5/2002 | Karaoguz et al. |
| 2002/0061001 | A1 | 5/2002 | Garcia-Luna-Aceves et al. |
| 2002/0061009 | A1 | 5/2002 | Sorensen |
| 2002/0067736 | A1 | 6/2002 | Garcia-Luna-Aceves et al. |
| 2002/0075940 | A1 | 6/2002 | Haartsen |
| 2002/0075941 | A1 | 6/2002 | Souissi et al. |
| 2002/0080768 | A1 | 6/2002 | Garcia-Luna-Aceves et al. |
| 2002/0085503 | A1 | 7/2002 | Hulyalkar et al. |
| 2002/0085526 | A1 | 7/2002 | Belcea |
| 2002/0089945 | A1 | 7/2002 | Belcea |
| 2002/0090979 | A1 | 7/2002 | Sydor |
| 2002/0101869 | A1 | 8/2002 | Garcia-Luna-Aceves et al. |
| 2002/0110105 | A1 | 8/2002 | Awater et al. |
| 2002/0150075 | A1 | 10/2002 | Belcea |
| 2002/0167960 | A1 | 11/2002 | Garcia-Luna-Aceves |
| 2002/0193072 | A1 * | 12/2002 | Alinikula et al. ............... 455/41 |
| 2004/0077383 | A1 | 4/2004 | Lappetelainen et al. |
| 2005/0037795 | A1 | 2/2005 | Aaltonen et al. |
| 2005/0054389 | A1 | 3/2005 | Lee et al. |
| 2005/0215280 | A1 | 9/2005 | Twitchell |
| 2005/0233704 | A1 | 10/2005 | Maekawa |
| 2006/0194564 | A1 | 8/2006 | Hokimoto et al. |

FOREIGN PATENT DOCUMENTS

| | | |
|---|---|---|
| EP | 0650274 | 4/1995 |
| EP | 0650274 A2 | 4/1995 |
| EP | 0 907 262 | 4/1999 |
| JP | 57089169 | 6/1982 |
| WO | 9828926 A2 | 7/1998 |
| WO | WO 00/62429 | 10/2000 |
| WO | WO 02/39242 | 5/2002 |

OTHER PUBLICATIONS

Goldsmith, A. et al., "Design Challenges for Energy-Constrained Ad Hoc Wireless Networks", IEEE Wireless Communications, pp. 8-27 (Aug. 2002).

Greenberg, A. et al., "Design and Analysis of Master/Slave Multiprocessors", IEEE Transactions on Computers, 40(8):963-976 (1991).

Hull, B. et al., "Poster Abstract: Bandwidth Management in Wireless Sensor Networks", ACM (SenSys'03), pp. 306-307 (2003).

International Preliminary Examination Report dated Feb. 24, 2004.

Johnson et al., "Dynamic Source Routing in Ad Hoc Wireless Networks" Computer Science Department, Carnegie Mellon University, 500 Forbes University, Pittsburgh, PA 15213-3891, 1996.

Park et al., "A Highly Adaptive Distributed Routing Algorithm for Mobile Wireless Networks" Naval Research Lab, USA, University of Maryland, USA, IEEE, 1997.

Perkins, C. et al., "Ad-Hoc On-Demand Distance Vector Routing", Proceedings of the 2nd IEEE Workshop on Mobile Computing Systems and Applications, pp. 90-100 (1999).

Poor, "Gradient Routing in Ad Hoc Networks" Media Laboratory, Massachusetts Institute of Technology, Cambridge, MA 02139, Spring 2000.

Royer et al., "A Review of Current Routing Protocols for Ad Hoc Mobile Wireless Networks" IEEE Personal Communications Apr. 1999.

Woo et al., "A Transmission Control Scheme for Media Access in Sensor Networks" Department of EECS, Computer Science Division and Intel XIS Lab, University of California, Berkeley, Mar. 2001.

Culler, et al., "A Network-Centric Approach to Embedded Software for Tiny Devices" University of California at Berkeley, Intel Research at Berkeley, Berkeley CA 94720, Oct. 2001.

* cited by examiner

COMMUNICATING OVER A WIRELESS NETWORK

CROSS-REFERENCE TO RELATED APPLICATIONS

This application is a continuation of U.S. patent application Ser. No. 11/443,869 filed May 31, 2006, entitled, "Communicating over a Wireless Network," which claims the benefit of U.S. Provisional Application No. 60/686,127, filed Jun. 1, 2005, and of U.S. Provisional Application No. 60/724,343, filed Oct. 6, 2005. The contents of U.S. Provisional Application No. 60/686,127, of U.S. Provisional Application No. 60/724,343, and U.S. patent application Ser. No. 11/443,869 are incorporated herein by reference as if set forth in full.

TECHNICAL FIELD

This application relates generally to communicating over a wireless network and, more particularly, to communicating over a wireless network using frequency hopping.

BACKGROUND

An ad hoc wireless network (a mesh network) is a self-organizing network in which the network devices themselves establish communication links with one another. Wireless networks may be used in different settings. For example, a wireless network may be established between monitoring and control devices and a host computer.

In one example, network devices monitor and control electrical systems, such as a building lighting system or fire alarm system. The devices report status information from their monitored system to the host computer. In response, the host computer sends control commands, which the devices use to control the electrical systems.

There are numerous issues involved in establishing and maintaining a wireless network, including power consumption and network congestion. Network devices on a wireless network typically run off of batteries, which must be checked and changed periodically. Changing batteries frequently can be inconvenient. Furthermore, as wireless networks become larger, the amount of data transmitted across those networks increases, which can result in data packet collision and, thus, degraded quality of service (QoS).

Nodes (e.g., devices) on a wireless network may communicate using a process known as frequency hopping. Frequency hopping allows nodes to communicate using different frequency channels. Nodes on the network typically cycle through different frequency channels, during which communications can be sent to, and received from, other nodes. When not communicating, the nodes typically enter a low-power state in order to save power. Heretofore, frequency hopping on a mesh network was implemented by synchronizing all devices of the network. That is, each device followed the same frequency sequence, and entered its communication mode at the same time and for the same duration. This configuration has proven difficult to maintain, particularly for large networks.

SUMMARY

This patent application describes methods and apparatus, including computer program products, for communicating over a wireless network.

In general, in one aspect, this application is directed to a first device for communicating with a wireless network comprised of nodes that are active for predefined activation times and that are at least partially dormant when not active. The communication method comprises identifying a start of communication via a message that exceeds a maximum activation time of nodes on the wireless network by a factor N, where N is equal to at least a maximum number of frequencies on the wireless network, and exchanging information with a second device comprising a node on the wireless network that is within a transmission range of the first device, where the information is exchanged following the message and includes frequency hopping data for the second device. This aspect may also include one or more of the following features. The information exchanged following the message may include frequency hopping data for the first device. The information may be exchanged over multiple frequencies through which the first device hops following the message. The multiple frequencies may be defined following the message.

In general, in another aspect, this application is directed to a first device for use in conjunction with a wireless network. The first device outputs a preamble to the wireless network, where the preamble contains time data corresponding to a duration of the preamble, and identifies (e.g., outputs or otherwise indicates) one or more listening frequencies of the first device that follow the preamble, where the one or more listening frequencies comprise one or more frequency bands at which the first device activates. The first device receives, from a second device in the wireless network and in the one or more listening frequencies, sequence data, wake-up data, and duty cycle data, where the sequence data is usable to obtain a sequence of frequencies at which the second device activates, the wake-up data corresponds to times at which the second device activates, and the duty cycle data is based on durations of time for which the second device activates. The first device stores (e.g., in memory) the sequence data, wake-up data, and duty cycle data. This aspect of the application may also include one or more of the following features.

The first device may output a search packet to the second device. The search packet may be output following the preamble and before receiving the sequence data, the wake-up data, and the duty cycle data from the second device. The search packet may identify the first device and contain sequence data, wake-up data, and duty cycle data for the first device. The wireless network may include N (N>2) devices including the second device, where each of the N devices is configured to activate at a frequency in a sequence of M (M>1) frequencies. The N devices may activate for time intervals, one of the N devices may have a maximum activation time interval of T, and the preamble may have a time duration that is at least a product of M*T.

The one or more listening frequencies may comprise a single listening frequency. The single listening frequency may be a same frequency at which the preamble is output. The one or more listening frequencies may comprise multiple listening frequencies. The search packet may identify sequence data and duty cycle data for the multiple listening frequencies. The sequence data may comprise a single number. The first device may generate the sequence of frequencies at which the second device activates by processing the single number using a predefined algorithm.

The first device may receive, from a third device in the wireless network, second sequence data, second wake-up data, and second duty cycle data. The second sequence data may be usable to obtain a sequence of frequencies at which the third device activates. The second wake-up data may correspond to times at which the third device activates, and the second duty cycle data may be based on durations of time for which the third device activates. The first sequence data, the first wake-up data, and the first duty cycle data (which are received by the first device from the second device) may be received in a same listening frequency following the preamble, but at different times than, the second sequence data, the second wake-up data, and the second duty cycle data.

The first device may receive, from the second device and in the one or more listening frequencies, sequence data, wake-up data, and duty cycle data, for a third device in the wireless network. The third device may not be within a wireless transmission range of the first device. The first device may send a communication to the second device using the sequence data, the wake-up data, and the duty cycle data that was received from the second device. The sending process may include (i) sending a second preamble, where the second preamble is sent at a frequency specified in the sequence data, at about a time specified in the wake-up data, and for a duration that exceeds a duration specified in the duty cycle data, (ii) receiving an acknowledgement signal from the second device in response to the second preamble, and (iii) sending information for the communication following the second preamble and in response to the acknowledgement signal. The information may be sent in a same frequency as the second preamble. The preamble may comprise a series of data packets transmitted in sequence, which may contain the time data from which the duration of the preamble can be determined.

In general, in another aspect, the application is directed to a device that includes memory configured to store instructions that are executable, and at least one processor configured to execute the instructions to enter an activation mode to communicate over a wireless network, and to enter a dormant mode periodically, where the at least one processor performs fewer tasks in the dormant mode than in the activation mode. To configure the device for communication or broadcast over the wireless network, the at least one processor executes instructions to output a preamble to the wireless network, where the preamble contains time data corresponding to a duration of the preamble, and to identify one or more listening frequencies of the device that follow the preamble. The one or more listening frequencies comprises one or more frequency bands at which the device enters the activation mode following the preamble. The at least one processor also executes instructions to receive, from a node in the wireless network and in the one or more listening frequencies, sequence data, wake-up data, and duty cycle data, where the sequence data is usable to obtain a sequence of frequencies at which the node activates, the wake-up data corresponds to times at which the node activates, and the duty cycle data is based on durations of time for which the node activates. The at least one processor also executes instructions to store the sequence data, wake-up data, and duty cycle data.

In general, in another aspect, the application is directed to a node in a wireless network that is configured to receive a preamble from a device, where the preamble contains time data corresponding to a duration of the preamble, and to identify one or more listening frequencies of the device that follow the preamble, where the one or more listening frequencies comprise one or more frequency bands at which the device activates. The node is also configured to send, to the device and in the one or more listening frequencies, sequence data, wake-up data, and duty cycle data, where the sequence data is usable to obtain a sequence of frequencies at which the node activates, the wake-up data corresponds to times at which the node activates, and the duty cycle data is based on durations of time for which the node activates. The sequence data, the wake-up data, and the duty cycle data may be sent at a time that is obtained to reduce conflict with other nodes sending data to the device following the preamble.

In general, in another aspect, the application is directed to a system comprising a wireless network that includes plural nodes, at least some which have an activation time during which the at least some nodes are active. The system includes a first device that is configured to identify a start of communication via a message that exceeds a maximum activation time of nodes on the wireless network by a factor N, where N is equal to at least a maximum number of frequencies on the wireless network, and a second device comprising a node on the wireless network. The second device is configured to respond to the message with frequency hopping data. The frequency hopping data from the second device identifies how the second device performs frequency hopping to receive data. This aspect may also include one or more of the following features.

The message may identify one or more frequencies that follow the message. The second device may be configured to respond to the message in the one or more frequencies. A response to the message by the second device may be timed to reduce conflict with possible messages from other devices on the wireless network. The message may comprise a preamble containing time data corresponding to a duration of the preamble. The first device may identify one or more listening frequencies of the first device that follow the preamble. The one or more listening frequencies may comprise one or more frequency bands at which the first device activates. The second device may be configured to respond to the message in the one or more listening frequencies. The frequency hopping data may comprise sequence data, wake-up data, and duty cycle data, where the sequence data is usable to obtain a sequence of frequencies at which the second device activates, the wake-up data corresponds to times at which the second device activates, and the duty cycle data is based on durations of time for which the second device activates.

Each of the foregoing aspects and features can be implemented via a method, one or more apparatus, one or more systems, and/or one or more computer program products comprised of executable instructions stored on one or more machine-readable media. Furthermore, the foregoing aspects and features may be combined in any manner.

The details of one or more examples are set forth in the accompanying drawings and the description below. Further features, aspects, and advantages will become apparent from the description, the drawings, and the claims.

DESCRIPTION OF THE DRAWINGS

Like reference numerals in different figures indicate like elements.

DETAILED DESCRIPTION

Figure 1:
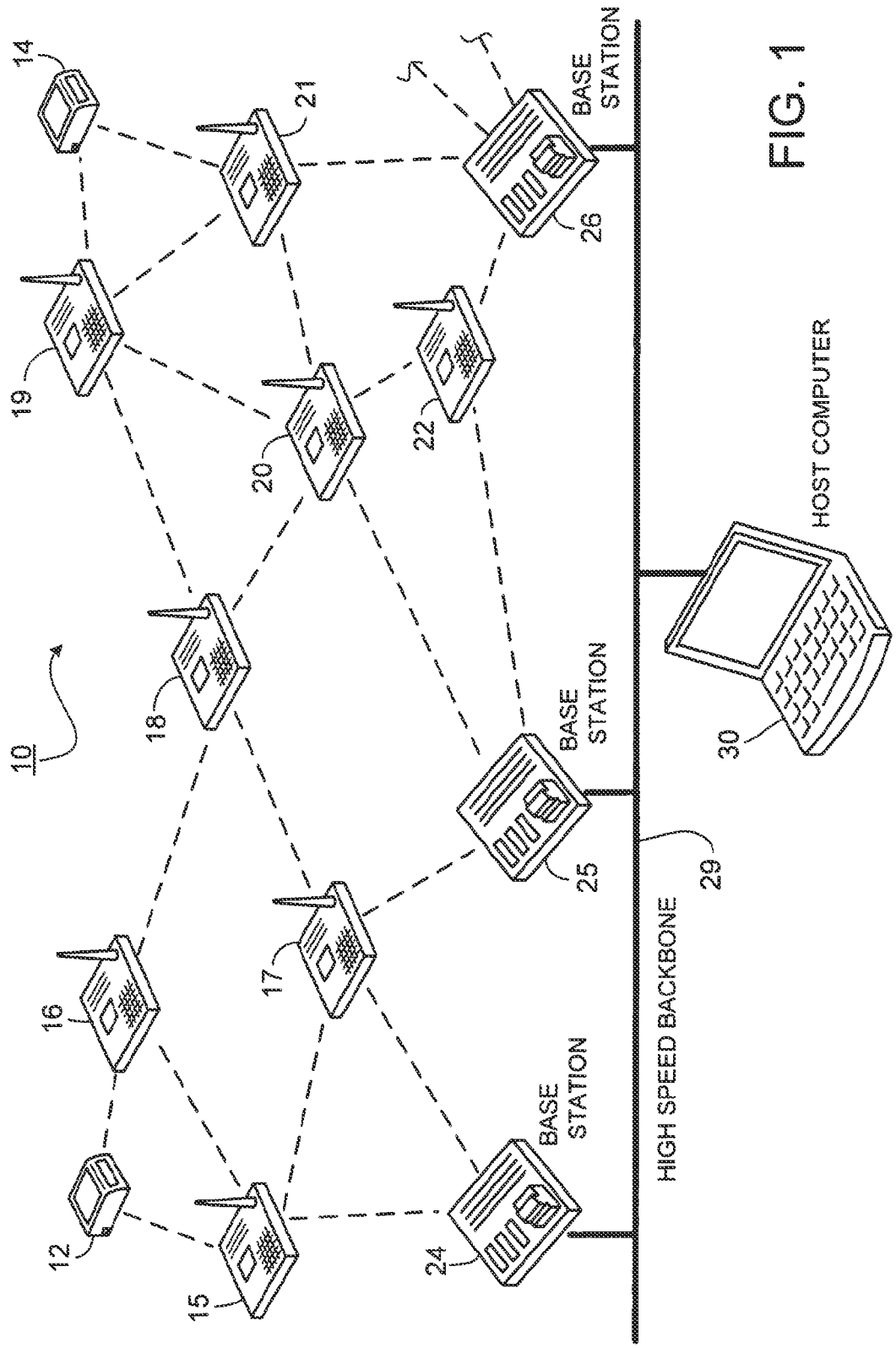
FIG. 1 is a block diagram of a wireless network.

Described herein is a process for use by devices to communicate over a wireless network using frequency hopping. FIG. 1 shows an exemplary wireless network 10 on which the process may be implemented. According to the process, devices on, or entering, the network may communicate over one or more frequency channels. In order to enable such communication, frequency hopping data is exchanged between devices upon entry of a device into the network. As described below, the frequency hopping data describes how each device communicates using frequency hopping, thereby enabling the devices to schedule communications for appropriate frequencies, times, and durations. Frequency hopping, as used herein, increases the capacity of the network because it allows network communications to overlap without substantially increasing collisions and packet loss.

Before describing how frequency hopping is used in a wireless network, we first describe an example of a wireless network and how it is established.

The Wireless Network

Wireless network 10 is a heterogeneous network, since devices on wireless network 10 need not perform the same functions. Wireless network 10 includes endpoint devices 12 and 14, intermediary devices 15 to 22, and base stations 24 to 26. Endpoint devices 12 and 14 and intermediary devices 15 to 22 may communicate via radio frequency (RF) links. RF links are shown as dotted lines. Base stations 24 to 26 may communicate to the intermediary devices via RF links and are wired to a high-speed backbone 29, through which base stations 24 to 26 communicate with a host computer 30 at a relatively high speed. High-speed backbone 29 may be any type of wired or wireless medium, such as Ethernet or Wi-Fi (wireless fidelity).

Each of endpoint devices 12 and 14, intermediary devices 15 to 22, and base stations 24 to 26 defines a node of wireless network 10. Each of these devices includes memory (not shown) that stores executable instructions and one or more processors (the one or more processors defining a processing system—not shown) for executing the instructions to perform functions described herein. In this implementation, the structure of endpoint devices 12 and 14 may be the same as the structure of intermediary devices 15 to 22, and the structure each base station 24 to 26 is the same. This may not be the case in other implementations. Each device is programmed with appropriate functionality.

Each node of wireless network 10 may enter a low-power, or "dormant", mode when not communicating over wireless network 10. During this low-power mode, a node may maintain some low-level operations; however, major processing functions are curtailed in order to conserve power. Following the low-power mode, the node "wakes-up", i.e., activates and enters its normal operational mode. During the normal operational mode, the node is again able to send/receive data over wireless network 10.

A network node may always enter the low-power mode whenever it is not communicating over wireless network or the network node may maintain its normal operational mode during some periods of non-communication over the wireless network. Reduced power consumption for network nodes is advantageous, since network nodes are often powered by low-capacity, small-size batteries, such as lithium coin cell batteries. Long life for batteries of this type can generally be achieved when average power consumption of a remote terminal (e.g., a node of the wireless network) is relatively low. The frequency hopping protocol described herein allows network nodes to remain in their low-power modes for relatively long periods of time, thereby further decreasing the amount of power consumed by those nodes.

The base stations, intermediary devices, and endpoint devices described above may be any type of computing device, such as a work station, a personal computer, a server, a portable computing device (e.g., a personal digital assistant or "PDA"), a cellular telephone, or any other type of intelligent device capable of executing instructions and connecting to a network. The base stations, intermediary devices, and endpoint devices can execute any number of computer programs, including applications that are configured to generate, receive, and transmit data packets for use on the network.

As described in U.S. patent application Ser. No. 10/860, 935, which was filed on Jun. 4, 2004 and which is incorporated herein by reference, a device entering network 10 may configure itself to operate as an intermediary device (e.g., a router or repeater) if necessary based on predefined criteria. Such a device may also have the capabilities (and configuration) of an endpoint device described below.

An endpoint device may be either a source or a destination of network data. In this implementation, one or more sensing devices may be connected to an endpoint device; other implementations may include endpoint devices without sensing devices. The sensing device(s) may be used to monitor physical systems, such as a processing plant, and variables, such as temperature. An endpoint device may acquire analog and/or digital signals from the sensing device(s) and transmit these signals to a base station via wireless network 10. An antenna (not shown) may be included on each endpoint device to effect transmission. Antennas may also be included on the other wireless devices in the network.

One or more actuators may also be connected to an endpoint device in this implementation. The endpoint device may use analog or digital command signals to command the actuator(s). These command signals may originate in the endpoint device or in a host computer 30. In the latter case, such command signals may be transmitted from host computer 30, to a base station, and then to the endpoint device, either directly or through one or more intermediary devices in wireless network 10.

An intermediary device is an intermediate node of wireless network 10 that functions as a router or repeater to forward data sent by endpoint devices, other intermediary devices, and/or base stations. Intermediary devices typically send the data in the format that the data is received and at the same rate as the data is received. Each endpoint device, described above, may configure itself to operate as an intermediary device, and vice versa. Intermediary devices also store routing information, such as a next hop along a network path to a data packet's intended destination, and a hop on a return path.

A base station is a node of the wireless network that may be connected to high-speed backbone 29. Base stations act as intermediaries between wireless network 10 and backbone 29, performing any necessary data and protocol conversions to permit data exchange between the two. Base stations that do not connect to backbone 29 may also be integrated into network 10. Such base stations (not shown in FIG. 1) may interface to a host device, and may be connected to other host devices or to the backbone via a wireless link through, e.g., a Wi-Fi (wireless fidelity) connection.

Host computer 30 may also connect to high-speed backbone 29. Host computer 30 supervises wireless network 10 and performs tasks that include receiving, processing and storing data generated by endpoint devices, and issuing command signals to the endpoint devices. Host computer 30 may also be used to reconfigure an endpoint device and/or intermediary devices to implement the wireless network described herein.

The only requirement in forming wireless network 10 is that every endpoint device should be within the RF transmission range of a base station or an intermediary device, and every intermediary device should be within the RF transmission range of a base station or another intermediary device. Devices outside of their RF transmission range are typically not able to communicate directly with each other over wireless network 10.

The overall topology of wireless network 10 resembles a spanning forest, in which the endpoint devices function as leaves, the intermediary devices function as branches, and the base stations function as roots. Like in a dense forest where trees can overlap, communication links among intermediary devices mesh to form a web-like structure, which enables the endpoint devices (leaves) and intermediary devices (branches) to communicate with multiple base stations (roots).

Multiple networks may occupy the same physical space. Data packets for such networks are differentiated by a network group identifier (ID). Thus, the networks remain logically separate even though they occupy the same physical space. Such networks may even use the same devices, either in the same or in different roles. For example, device 24 may act as a router for one network and as a base station for another network; device 17 may operate as an endpoint device for one network and as a base station for another network, etc. Operation of devices in such different networks is as described herein. Devices may be programmed to operate as base stations, routers, or endpoint devices in one network by specifying the group ID of that network and the functionality of the device for that group ID. A host computer may initiate/control programming of the various devices or the devices may be programmed directly on the devices themselves. Network data packets typically contain the network group ID for their corresponding network.

In networks, such as network 10, all of the base stations may be connected to host computer 30. In this case, data packets may be stored and organized by host computer 30. In networks such as these, host computer 30 maintains a central database comprised of packets from one or more endpoint devices. In other networks, the base stations are not all connected to the same host computer. In this type of network, different base stations may receive packets resulting from a single transmission of an endpoint device. Each base station maintains a separate database of packets that it receives. The various base stations may synchronize their databases periodically. Synchronization may occur via wireless connection or via a wired connection, such as Ethernet (if a wired connection exists among the various databases). This synchronization results in each base station containing a complete database of all packets that reach base stations in the network. Redundant databases such as these are particularly advantageous because they provide back-up in the event of failure of a base station on the network.

Establishing the Wireless Network

As described in U.S. patent application Ser. No. 10/304,528, which was filed on Nov. 26, 2002 and which is incorporated herein by reference, there is no connectivity among devices of a wireless network until at least one endpoint device initiates communication, e.g., by sending a "a hello message". This process is referred to here as "terminal-initiated polling". Communication may be initiated when an endpoint device, such as endpoint device 12, is first activated. That is, when endpoint device 12 is first activated, endpoint device 12 broadcasts a hello message to interrogate its surroundings. The term "broadcast" means to send (or transmit) to one or more other network devices.

The hello message is a specialized data packet and is therefore referred to as a "search packet". The search packet may contain information, such as the identity of an endpoint device and a request to enter the wireless network. All intermediary devices (e.g., routers or repeaters) within the RF transmission range (typically 30 to 100 feet, but not limited to these values) of the endpoint device re-broadcast the search packet to seek connections with base stations or other intermediary devices within their respective RF transmission ranges. The intermediary devices re-broadcast the search packet until the search packet reaches all of the base stations 24 to 26. This technique of propagating the search packet through the network is referred to as "flooding" the network.

When a base station receives a search packet, the base station responds by generating and broadcasting a confirmation packet. The confirmation packet is also propagated throughout the entire wireless network 10 by flooding the network. Eventually, the confirmation packet reaches the endpoint device that initiated the hello message. At this point, communication among the network nodes is possible.

Along the route that the confirmation packet takes back and forth through wireless network 10, intermediary devices keep track of which node sent them the confirmation packet, i.e., an immediately preceding network node along the route. Each intermediary device stores a pointer in memory that points to this node. The pointers enable the intermediary devices to identify neighboring nodes that can be used in transporting a data packet closer to a base station. These neighboring nodes are referred to as master nodes, or simply "masters". A master acts as a primary recipient of data from its dependent, or "slave", node.

One advantage of terminal-initiated polling is that an endpoint device need not wait to join a wireless network. That is, since the endpoint device initiates entry into the wireless network, the endpoint device controls when to establish a presence in the wireless network. The endpoint device is not required to wait for a periodic beacon signal from a base station before joining the wireless network.

Joining the Wireless Network

A heterogeneous network is formed without a rigidly prescribed hierarchy. In particular, every node in wireless network 10 can assume the role of an endpoint device or an intermediary device and can change dynamically based on criteria specified by a user. Essentially, the wireless network takes advantage of the flexibility of homogeneous networks and the power efficiency of heterogeneous networks. A process for joining wireless network 10 is described with respect to FIG. 2.

Figure 2:
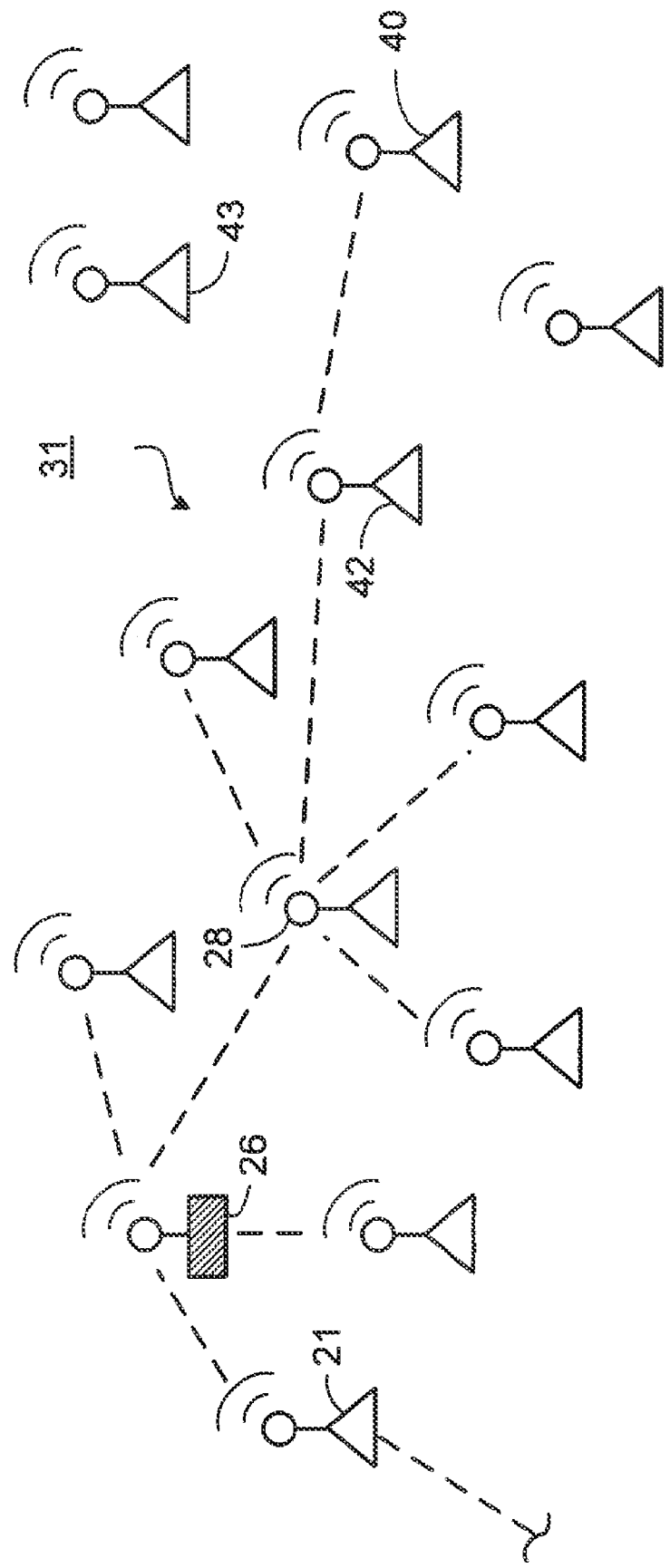
FIG. 2 is a block diagram of a wireless network that includes a portion of the network of FIG. 1.

FIG. 2 shows a wireless network 31, which may be part of wireless network 10. When a target device, such as device 40 in FIG. 2, is activated for the first time and wants to join network 31, device 40 attempts to locate a packet forwarding device, such as an intermediary device or base station, in its neighborhood. Device 40 does this by broadcasting a search packet to the network, as described in the preceding and following sections. In one implementation, the network neighborhood includes all devices to which device 40 has a direct RF link; although this application is not limited to this definition of "neighborhood".

Device 40 receives response(s) to its search packet from its neighbor(s). Device 40 uses those responses to determine, e.g., if one or more intermediary devices is within its network neighborhood (meaning that device 40 can establish an RF link to such a device). If so, device 40 selects an intermediary device that satisfies predefined criteria, and designates that device as its primary master (and others as secondary, tertiary, etc. masters, if applicable). Device 40 then joins the network as an endpoint device with a low duty cycle. The same process occurs if device 40 identifies a base station in its neighborhood.

Criteria for selecting the primary master may include, but are not limited to, the distance to a base station (or gateway), the quality of the communication link to the intermediary device, and the battery capacity of the intermediary device. For example, device 40 may select a primary master node having less than a certain number of hops to a base station or endpoint device. In addition, in this implementation, device 40 may select the primary master based also (or solely) on other criteria. For example, device 40 may select a node having a link with low amounts of noise, and/or having a large battery capacity (thereby ensuring more reliable operation of the primary master).

If device 40 cannot find any intermediary device (or base station) in its network neighborhood, device 40 will start operating as an intermediary device (e.g., a router). Code programmed into device 40 initiates its operation as a router, which includes forwarding data packets, maintaining routing information, and may enter a low-power mode less often, among other things. During its operation as a router, device 40 "listens to" transmissions from neighboring devices, such as node 43. Node 43, in this case, is an endpoint device, since it is not an intermediary device or a base station (if it were an intermediary device or base station, device 40 would have recognized it as such in response to device 40's initial attempt at entry into the network). Device 40 "listens for" data transmissions from node 43, not search packet transmissions. This is because transmission of a search packet implies that node 43 is looking for connection to network 10. A data transmission, on the other hand, implies that node 43 is already connected to network 10.

After device 40 detects a data transmission from node 43, device 40 attempts to determine if node 43 is connected to network 10. To do this, device 40 may listen for re-transmission of the same data packet. Re-transmission of the same data packet implies that node 43 is not connected to the network. Device 40 may listen for an acknowledgement (or "ack") packet in response to the original transmission. The ack packet is sent by another node (e.g., node 42) that is on the network. This may not always work, however, because device 40 may be unable to receive the ack packet due, e.g., to a distance from a node transmitting the ack packet. Device 40 may send a packet to node 43 to determine its connectivity. This packet may advise node 43 of the existence of device 40, and ask node 43 whether node 43 is connected to the network.

Assuming that device 40 is able to confirm that node 43 is connected to the network, device 40 may send a data packet to node 43 asking node 43 (which, as noted above, is an endpoint device) to reconfigure itself as a router for device 40. Node 43 decides whether to configure itself as a router based, e.g., on its capabilities, available bandwidth, network access, and the like. Assuming that node 43 configures itself as a router, device 40 then reconfigures itself to be an endpoint device that routes communications through node 43. Device 40 selects node 43 to be its own primary master node. If node 43 is not connected to the network, and no other nodes are available to act as a router for device 40, after a period of time device 40 may configure itself as an endpoint device.

Device 40 may be programmed to reconfigure itself as an endpoint device after operating as a router for a predetermined amount of time, e.g., one hour, or more or less than one hour. Any time period may be used. As noted above, device 40 may enter the low-power mode periodically. Upon exiting ("awakening") from the low-power mode, device 40 may again try to establish a connection to the network as an endpoint device, as described above. If that is not successful, device 40 may try to establish a connection to the network as a router in the manner described above, i.e., by configuring itself as a router, listening for non-search packet transmissions, etc.

The amount of time that device 40 remains configured as a router may be programmed into device 40. Alternatively, this amount of time may be dictated by network traffic (e.g., search packets) in the vicinity of device 40. For example, a large number of search packets detected in the vicinity of device 40 indicates that there are devices in the neighborhood (which, perhaps, are just not yet connected to the network). By contrast, few search packets detected in the vicinity of device 40 indicates that there may be few devices in the neighborhood (and, perhaps, device 40 is isolated). Thus, if a large number of data packets are detected in the vicinity of device 40, device 40 configures itself as a router for a longer period of time (since more devices implies a higher probability of achieving a network connection). If few data packets are detected in the vicinity of device 40, device 40 configures itself as an endpoint device that can enter low-power mode for a relatively long period of time. In this case, device 40 "awakens" from the low-power mode less frequently, since there is less of a chance of achieving a network connection.

Device 40 may operate as an intermediary node for one or more other devices on network 31. Assuming that device 40 has a link to a master intermediary device, device 40 may decide whether to remain an intermediary device for neighboring endpoint devices. From the intermediary device IDs (identifiers) reported by neighboring endpoint devices, device 40 can identify whether any one of the neighboring endpoint devices relies on device 40 as its only intermediary device. For example, device 40 can query other intermediary devices for routing information. If at least one device does rely solely on device 40, then device 40 remains an intermediary device; otherwise device 40 configures itself as an endpoint device.

If device 40 does not receive data or an intermediary device request from its neighboring nodes (endpoint devices or intermediary devices) for a predefined amount of time, device 40 may configure itself as endpoint device. The predefined time can be programmed into the device or selected based on one or more parameters. One example of such a parameter is the frequency with which a dependent endpoint device communicates with the intermediary device; i.e., the less frequent the communication from the endpoint device, the more often device 40 configures itself as an endpoint device.

When an intermediary device becomes a master intermediary device of a high number of nodes, a substantial amount of traffic can flow into the intermediary device. This can result in data congestion and, possibly, frequent data packet collision. Excessive traffic can be diverted for an overloaded intermediary device by obtaining a new intermediary device from endpoint devices in the neighborhood. In this situation, an intermediary device can issue and broadcast a router election request to its neighboring endpoint devices. Upon receiving this router election request, an endpoint device responds with a message indicating its operating status, which may include the ID of intermediary devices that it communicates with, its data generation rate, its remaining battery charge, etc.

After receiving responses from all neighboring endpoint devices, the intermediary device selects a new intermediary device based on a certain criteria. For example, an endpoint device that communicates with the most number of intermediary devices can offer higher connectivity with the rest of the network; an endpoint device with a relatively low data generation rate can offer more bandwidth to route data for other nodes; and an endpoint device with the most battery charge can afford to operate with a high duty cycle. The intermediary device instructs the selected node to configure itself as a router. One purpose of instructing one of the neighboring endpoint devices to be a router is to divert traffic. Once a new router is elected, the intermediary device need not select this new router as its own primary master. The overloaded intermediary device elects a new router simply to increase the number of intermediary devices in the neighborhood, so that traffic congestion through the overloaded intermediary device can be alleviated.

Every node in the network may continually search for a better primary master intermediary device in the manner described above. In most cases, a node can have one or multiple alternative masters in addition to its primary master. As such a new primary master can be selected from the alternative masters. However, there are situations where a node may find that all its master intermediary devices are unreliable. In this case, a node can broadcast a router election request to its neighboring nodes. Upon receiving the router election request, a neighboring node, either an endpoint device, an intermediary device or a base station, will respond with its operating status. After reviewing all responses, the requesting node selects a new primary master from the neighboring nodes. If the selected node is already an intermediary device, it is simply recognized as the new primary master of the requesting node. If the node is an endpoint device, the requesting node issues a message to request the endpoint device to become an intermediary device as well as the primary master of the requesting node. The endpoint device decides whether to become an intermediary device based, e.g., on its capabilities and connection to the network. If it does become an intermediary device, the endpoint device notifies the requesting node.

Every node may seek to operate as an endpoint device. A node will serve as an intermediary device when the node recognizes that either there is no intermediary device available in its neighborhood, or all neighboring intermediary devices cannot provide reliable connectivity due, e.g., to excessive traffic or radio link issues.

Ultimately, the process for joining the wireless network may lead to electing a relatively small number of intermediary device nodes based on predefined criteria needed to maintain network connectivity. The criteria can include, but are not limited to, one or more of the factors mentioned above, such as a number of hops to a base station, a reliability of the communication link, and remaining battery life. The probability of an endpoint device becoming an intermediary device node can be adjusted by tuning these factors. These factors may be tuned, e.g., via host computer 30 and/or by directly accessing the appropriate network device and programming the appropriate values.

Frequency Hopping in the Wireless Network

The frequency hopping protocol described below is described in the context of a heterogeneous wireless network, such as wireless network 10. The frequency hopping protocol, however, is not limited to use with a heterogeneous network, but rather may also be used with a homogeneous network, e.g., a network in which all devices have the same structure and/or function. For example, a wireless network that includes only routers may benefit from the frequency hopping protocol because the frequency hopping protocol allows the routers to operate with a reduced duty cycle (as described below). As a result, batteries that power the routers will use power less quickly.

Furthermore, the frequency hopping protocol does not require a common time base throughout an entire wireless network. That is, nodes of a wireless network communicate with their neighboring nodes based on knowledge of the neighboring nodes' wake-up times, wake-up durations, and/or channel sequences (as described below). One advantage of this process is that it allows nodes to wake-up more frequently, each time doing so with a relatively short duration. Because nodes wake-up more frequently, packets can propagate through the network relatively quickly. As a result, the wireless network can operate with increased robustness (proactive channel switching), relatively high bandwidth, relatively low power consumption, and relatively low latency.

Figure 3:
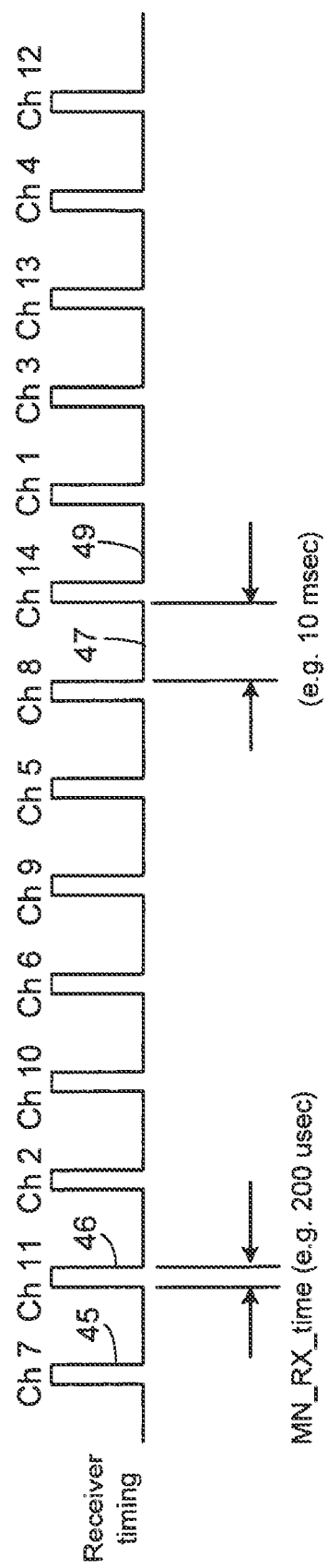
FIG. 3 is a timing diagram showing a frequency hopping sequence and timing for a receiving device on a wireless network, such as that of FIGS. 1 and 2.

Turning now to one example, one or more nodes (e.g., all nodes) of wireless network 10 (31) may communicate using frequency hopping. In the context of a wireless network, frequency hopping may be implemented by providing windows, during which network nodes can receive communications from other nodes. Referring to FIG. 3, a receiving node is a node that is to receive communication. The receiving node wakes, meaning that it activates and operates in its normal operational mode, at times 45, 46, etc. for predefined durations. The durations are labeled as MN_RX_time, where "MN" stands for "Mesh Node" and "RX" for "receive"("TX" stands for "transmit"). MN_RX_time may also be changed on the fly depending on the network status, and each node may have a different MN_RX_time. The receiving node wakes in predefined frequency channels, which are labeled Ch 7, Ch 11, etc. At other times 47, 49, etc., the receiving node may be in a low-power, or dormant, mode, which is labeled MN_sleep_time.

We use node 15 (FIG. 1) as an initial example. During its normal operational mode, the receiving node, here node 15, is able to receive communications only in specified frequency channels. For example, at time 46, node 15 wakes-up in channel (Ch) 11 for a duration of 200 μs (microseconds). If another node on the wireless network wants to send a communication to node 15, the other node must do so within the 200 μs duration in Ch 11; otherwise, it must wait until node 15 wakes-up again (e.g., in another 10 ms (milliseconds)). When node 15 wakes again, however, it may wake in a different frequency channel (Ch 2), although it will typically (although need not) wake for the same duration. A node that wants to communicate with node 15 must therefore know the times at which node 15 wakes, the durations for which node 15 is awake, and the channel sequence for node 15 (so that the node wanting to communicate with node 15 can determine the channel in which to send communications to node 15).

To complicate matters, in network 10, the nodes need not have the same wake-up times, wake-up durations, or channel sequences. For example, node 15 may wake up once every 10 ms for 200 μs, node 16 may wake up once every two seconds for 200 μs, node 17 may wake up once every half second for 50 μs, and so on. Likewise, node 15 may follow a random channel sequence of 7, 11, 2, 10 . . . 12, node 16 may follow a channel sequence of 16, 15, 14, 13 . . . 1, and node 17 may follow a channel sequence of 1, 2, 3, 4 . . . 16. The channel sequences may be stored in frequency hopping lists in memory on each node. Although each node may follow a different channel sequence, each node typically (although need not) maintains its same sequence. That is, node 15 repeats its sequence of 7, 11, 2, 10 . . . 12 periodically, node 16 repeats its sequence 16, 15, 14, 13 . . . 1 periodically, and node 17 repeats its sequence of 1, 2, 3, 4 . . . 16 periodically. In this implementation (2.4 GHz RF operation), each node communicates over sixteen channels; however, in other implementations, some nodes may communicate over less than, or more than, the sixteen channels specified herein. For example, in 900 MHz RF operation, there may be 50 frequency channels.

A sending node (i.e., a node that is to send communication), therefore, should know the frequency sequence, wake-up time, and duty cycle of a receiving node in order to determine when to send a communication so that the communication will be received. A sending node can typically wake and send communications in any channel irrespective of its own receiving frequency channel sequence and timing. A receiving node typically sends an ack packet back to a sending node to acknowledge receipt of a communication. If the sending node does not receive an appropriate ack packet in response to a communication, the sending node may re-send the communication at a subsequent time and frequency channel for the receiving node (which may, or may not, be the time and frequency that immediately follows the current time and frequency). For example, the sending node may be programmed to retry the communication at a random subsequent time, thereby reducing the chances of collisions with other sending nodes. This process may be repeated until the sending node receives an ack packet from the receiving node.

In this implementation, each node stores, and keeps track of, clocks of its neighboring nodes that are both upstream and downstream in a communication path. Search response packets include time stamps and may include the channel sequence of the node that sends the ack packet. Each time a search response packet is received from a neighboring node, the receiving device will adjust the neighbor's clock in its neighborhood database to the received time. By way of example, for two upstream nodes (primary and secondary) and 30 downstream nodes, a node should store at least 32 independent clocks (or other next-time-to-wake-up information) in its neighborhood database. Each clock may include at least two bytes, which can store 65536 clock ticks. So, with increments of 1 ms (a clock tick), a clock can cover up to 65 seconds of next time-to-wake-up information. This may be done for all communications, not just search response packets.

One problem for a new node entering a wireless network is that the new node does not know its neighboring nodes' frequency sequence, wake-up time, and duty cycle. Accordingly, a protocol (which is referred to herein as "the frequency hopping protocol") is provided that enables a device to discover how neighboring network nodes perform frequency hopping, e.g., to discover their frequency sequence data, wake-up data, and duty cycle data. In this context, the frequency sequence data (or simply sequence data) is usable to obtain a sequence of frequencies at which a neighboring node activates; the wake-up data corresponds to times at which the neighboring node activates; and the duty cycle data corresponds to durations of time for which the neighboring node activates.

In the context of the processes described above for joining and establishing the wireless network, the hello message (e.g., the search packets) is transmitted between a preamble (described below) used in the frequency hopping protocol and listening frequency(ies) that follow the preamble. The frequency hopping protocol is also used to broadcast over the wireless network, as described below.

Figure 4:
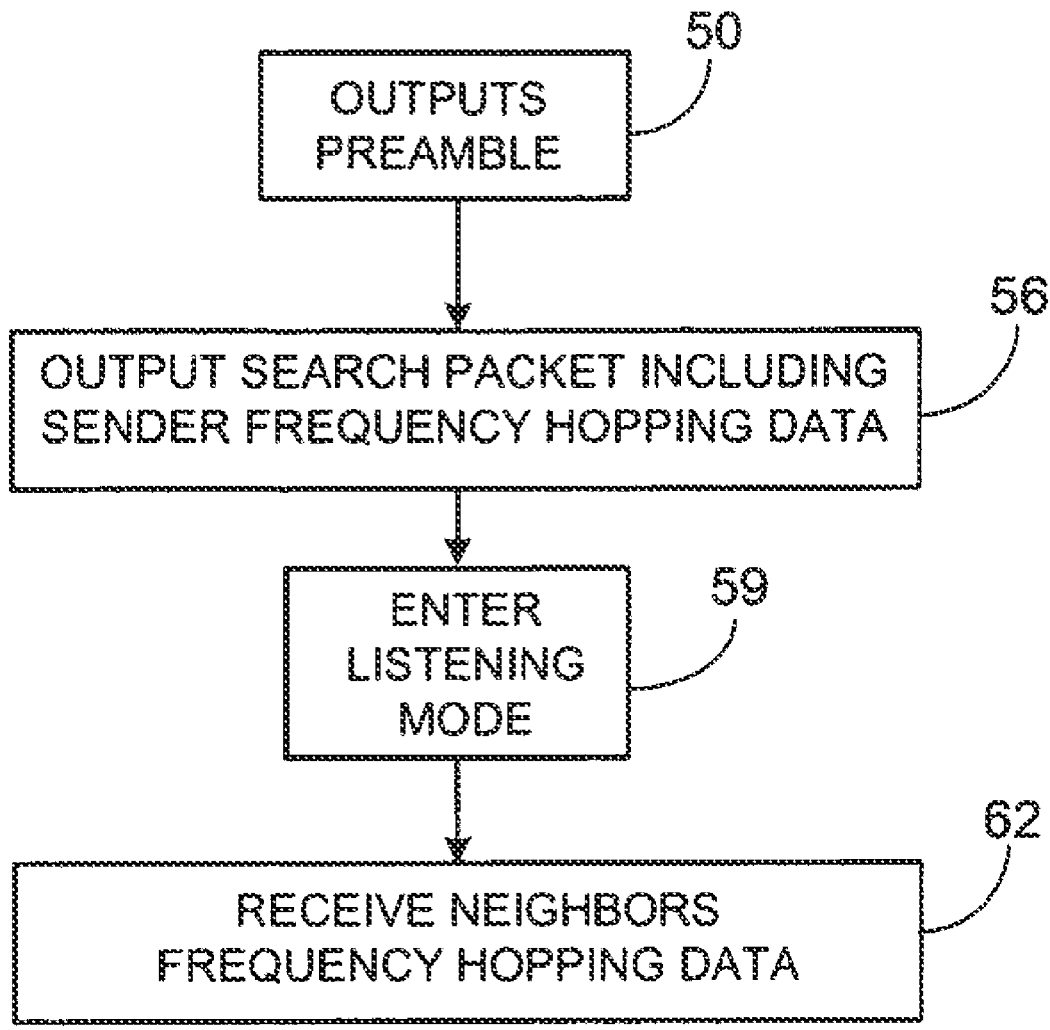
FIG. 4 is a flowchart showing a frequency hopping protocol.
Figure 5A:
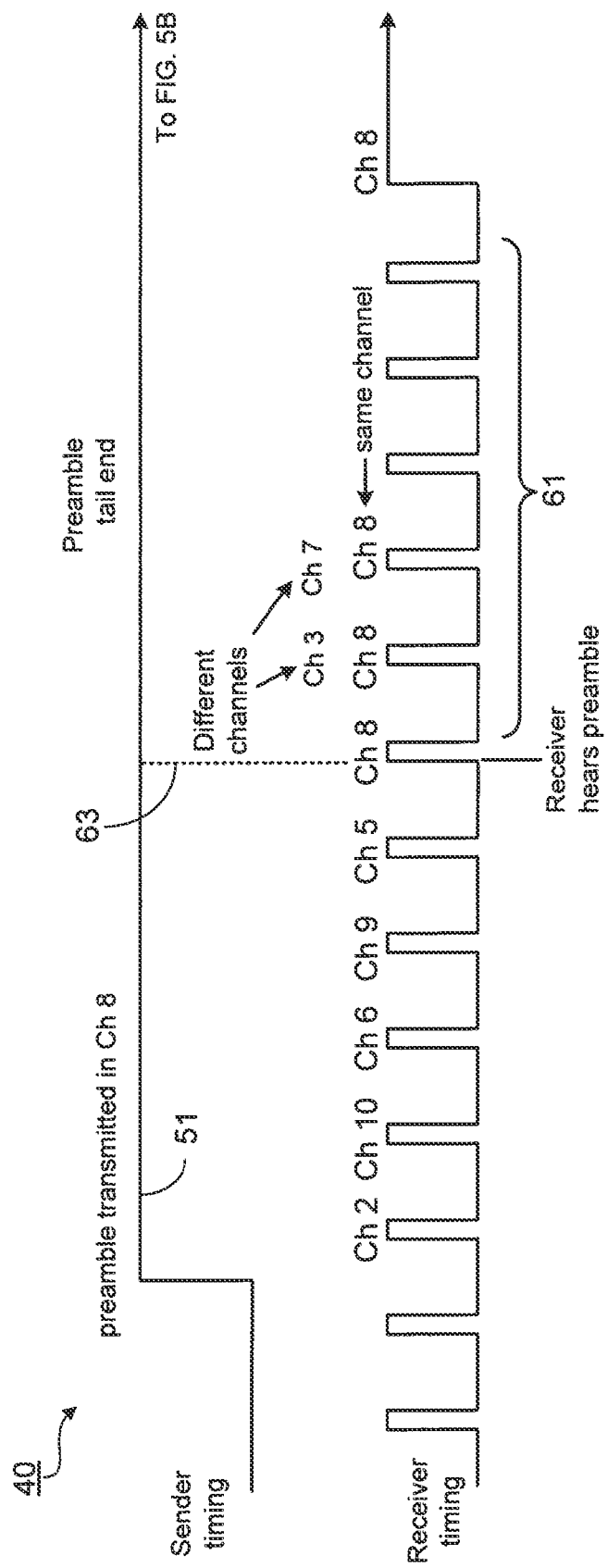
FIG. 5, comprised of FIGS. 5A and 5B, shows timing diagrams depicting operation of the frequency hopping protocol, which includes a sending device's timing and a receiving device's timing used in the exchange of information between devices.
Figure 5B:
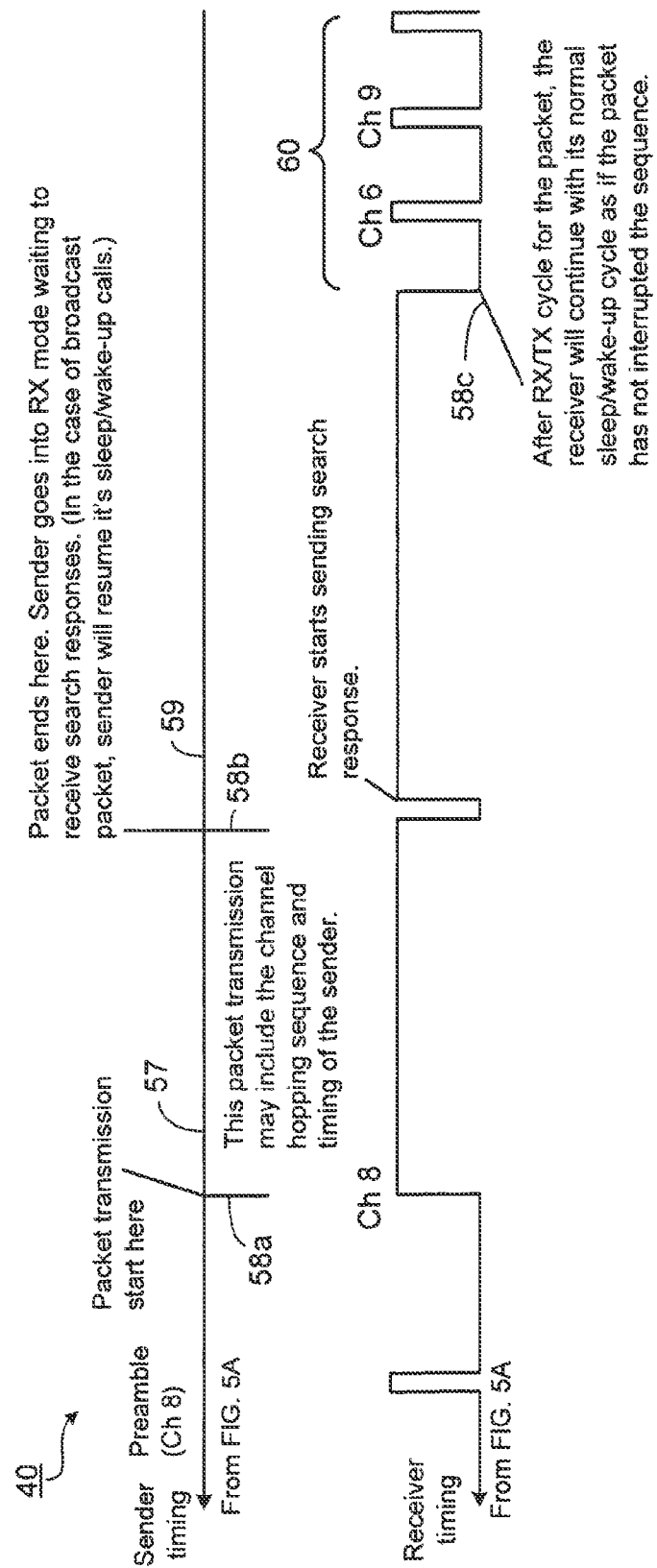

Referring to FIGS. 4 and 5, a sending device (e.g., device 40 of FIG. 2) entering a wireless network outputs (50) a preamble 51. In one implementation, the preamble is a sequence of packets that are output from the device. The data packets may be IEEE802.15.4 data packets, and each packet may be, e.g., 1 ms (~25 bytes). The preamble is designed, essentially, to get the attention of nodes that neighbor the device. In a non-IEEE802.15.4 context, the preamble may represent a specific data pattern, e.g., "01010101 . . . ". The preamble identifies a start of communication between device 40 and one or more of its neighbors. In this context, a node that neighbors the device is any node that is part of the wireless network and that is within a wireless transmission range of the device. In order to ensure that every neighboring node identifies the preamble, the preamble is transmitted in one frequency channel (e.g., Ch 8 in FIG. 5), and is structured so that it exceeds a maximum activation time of all nodes on the wireless network by a factor N, where N is equal to at least a maximum number of frequencies on the wireless network. This ensures that all neighboring nodes of device 40 will wake in the frequency channel of the preamble and thereby receive the preamble at least once during its activation cycle.

By way of example, if the maximum time between activations for any node on the wireless network is 5 s (where "s" stands for seconds), and the network recognizes sixteen frequency channels, the preamble will be at least 80 s (16×5 s). In another example, the time between activation (also known as the node's sleep cycle) is 10.2 ms and there are a total of 50 channels, resulting in a preamble of 510 ms. In still another example, the preamble may be about 3.2 s. It is noted that, in some circumstances (described below), a preamble of greater than 400 ms may need to be divided among multiple frequency channels in accordance with Federal Communications Commission (FCC) regulations.

Figure 6:
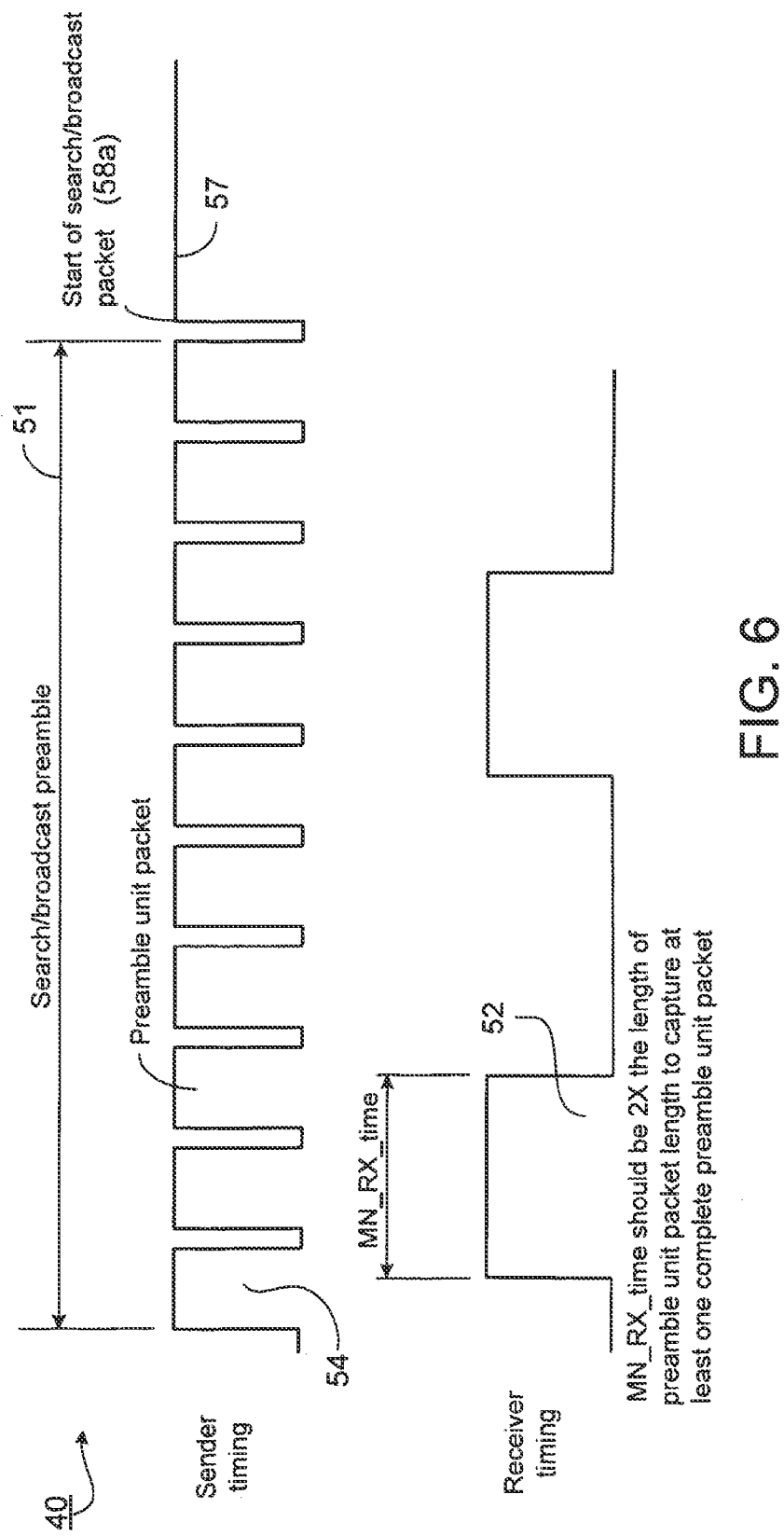
FIG. 6 shows timing diagrams depicting individual units of a preamble used in the frequency hopping protocol in relation to a normal operational mode of a receiving device.

Referring to FIG. 6, the duration 52 (MN_RX_time) during which the receiver listens for communications in a frequency channel should be at least twice as long as the length of a preamble packet unit 54. This is done in order to ensure that at least one complete preamble packet (or "preamble unit") is recognized by the receiver. If a start of frame delimiter (SFD) is used to detect the preamble, MN_RX_time need be only slightly longer than a preamble unit.

The duration of the preamble may be expressed mathematically as follows. Each preamble unit contains a time-to-tail end value (so that any neighboring node that receives the preamble packet unit knows when to return to the preamble channel to receive a search packet). Assume that the length of the preamble packet unit in milliseconds is L_pu. In this case, $$MN\_RX\_time = 2 * L\_pu.$$

MN_cycle_time is the duty cycle of a network node, and is equal to M_ps*2*L_pu, where M_ps is a predefined power saving multiplier. MN_sleep_time, which is the amount of time a node is in its low-power, or dormant, cycle is defined as follows:

$$MN\_sleep\_time = MN\_cycle\_time - MN\_RX\_time.$$

The power saving multiplier M_ps is essentially the ratio of MN_cycle_time to MN_RX_time. A higher M_ps means a higher ratio of sleep time to activation time, resulting in more power savings.

The entire length of the preamble is thus determined as follows:

$$preamble\_length = CN\_hop * MN\_cycle\_time = CN\_hop * M\_ps * 2 * L\_pu,$$

where CN_hop is the maximum number of channels in the hopping sequence of a node on the network having a maximum MN_sleep_time.

Typically, CSMA (Carrier Sense Multiple Access) listening is conducted before the preamble is output in order to make sure there is currently no other preamble in the same frequency channel. If there is already a preamble in that frequency channel, the node can decide to wait until an ongoing search process is over or to jump to another frequency channel that has no on-going search process, and begin its search process immediately in that other frequency channel, i.e., send out the preamble in that other frequency, etc.

The preamble may include timing information. More specifically, following the preamble, the neighboring nodes transmit their sequence data, wake-up data, and duty cycle data to device 40. The neighboring nodes therefore need to know when the preamble will end so that they can begin transmission. The preamble therefore may include timing data, which identifies the end of the preamble. For example, in one implementation, the preamble is a sequence of data packets transmitted in a stream. Each data packet may contain a countdown time, which indicates the remaining length of the preamble. In other implementations, only select data packets may contain the countdown time.

Following the preamble, device 40 transmits (56) its search (or hello) packet 57 at 58*a*. The search packet includes the sequence data, wake-up data, and duty cycle data for device 40. That is, the search packet include the sequence of frequencies in which device 40 listens for communications, the times at which device 40 listens in those frequencies, and the listening duration. This information is stored in frequency hopping list(s) in neighboring nodes, and enables those nodes to send communications to device 40.

After transmission of the search packet, device 40 listens (59) in one or more frequencies at 58*b* for communications from its neighboring nodes, specifically, the sequence data, wake-up data, and duty cycle data for the neighboring nodes (e.g., nodes 42 and 43, assuming, for this example, that node 43 is already a member of the network and within the transmission range of node 40). That is, the sender goes into receive mode and waits to receive search responses (if sending a broadcast packet, the sender will resume its sleep/wake cycle). In order to transmit frequency hopping data, such as sequence data, wake-up data, and duty cycle data, to device 40, the neighboring nodes need to know the frequency(ies) that device 40 will be listening in following the preamble. In this regard, device 40 may listen in a single frequency or in multiple frequencies. In other words, device 40 may frequency hop during the listening phase 59 following the preamble. In any case, the frequency(ies) that device 40 will be listening in should be known to the neighboring nodes.

In one implementation, device 40 listens in the same frequency channel in which the preamble was sent. Thus, a neighboring node identifies device 40's listening frequency (ies) by the frequency of the preamble (i.e., it knows beforehand that the two are the same). In this case, as shown in FIG. 5, a neighboring node (e.g., node 42) locks onto that channel (in FIG. 5, channel (Ch) 8 at 63) after the preamble is detected, and continues to wake in that channel. It is noted, however, that the node's internal channel hopping clock continues to run so that the node can resume its frequency hopping sequence 60 at 58*c* (after sending its frequency hopping data to device 40) as if that sequence were never interrupted.

In another implementation, the neighboring nodes use timing data in the preamble to schedule a communication to device 40. That is, a neighboring node keeps track of the amount of time left in the preamble and, following the preamble, sends its frequency hopping data to device 40 in the same frequency channel as the preamble. Prior to sending its frequency hopping data (e.g., time 61), the node hops frequencies, and performs transmitting and receiving operations, in accordance with its usual schedule.

In still another implementation, device 40 sends the same preamble packet without timing data and, when it is near the end of preamble period, device 40 sets a flags in the preamble packet indicating the upcoming end of the preamble (sometimes referred to as its "tail"). The neighboring nodes may check between wake-up times in order to determine whether the preamble is near its end. Prior to this, the node hops frequencies, and performs transmitting and receiving operations, in accordance with its usual schedule. In this implementation, the preamble may contain data, such as timing data, indicating that that the preamble is near its end. In this case, when a node determines that the preamble is near its end (e.g., within a predefined time of its end), the node locks onto the channel that the preamble is transmitted in, and wakes only in that channel. It is noted, however, that the node's internal channel hopping clock continues to run so that the node can resume its frequency hopping sequence (after sending its frequency hopping data to device 40) as if that sequence were never interrupted.

In a case where device 40 listens in multiple frequencies, device 40 provides the neighboring nodes with the sequence data, wake-up data, and duty cycle data for the listening period. This information can be provided in a search packet which is broadcast following the preamble, and in the same channel as the preamble (thereby ensuring that the neighboring nodes will receive the search packet), but before the listening period. Alternatively, this information may be provided in the preamble itself.

During the listening period 59 of device 40, the neighboring nodes transmit their frequency hopping data, such as their sequence data, wake-up data, and duty cycle data to device 40. Device 40 receives (62) the frequency hopping data for each node, and stores it in memory in association with a node identifier and the clock for the node. Thus, device 40 knows the frequency hopping data for its neighboring nodes, and vice versa. Device 40 is thus able to keep track of the current frequency channel, wake-up time, and duty cycle of all of its neighboring nodes, and the neighboring nodes can do the same for device 40.

During the listening mode, a number of neighboring nodes may attempt to transmit frequency hopping data to device 40. For example, first, second, third, etc. neighbors may all attempt to transmit their sequence data, wake-up data, and duty cycle data to device 40. If all devices attempt to transmit at the same time, this can result in data collision, and the required data may not reach device 40. Therefore, the listening mode of device 40 is structured to be long enough so that numerous nodes can send their data at different times. For example, the listening mode may be 100 ms, 500 ms, or longer.

Figure 7:
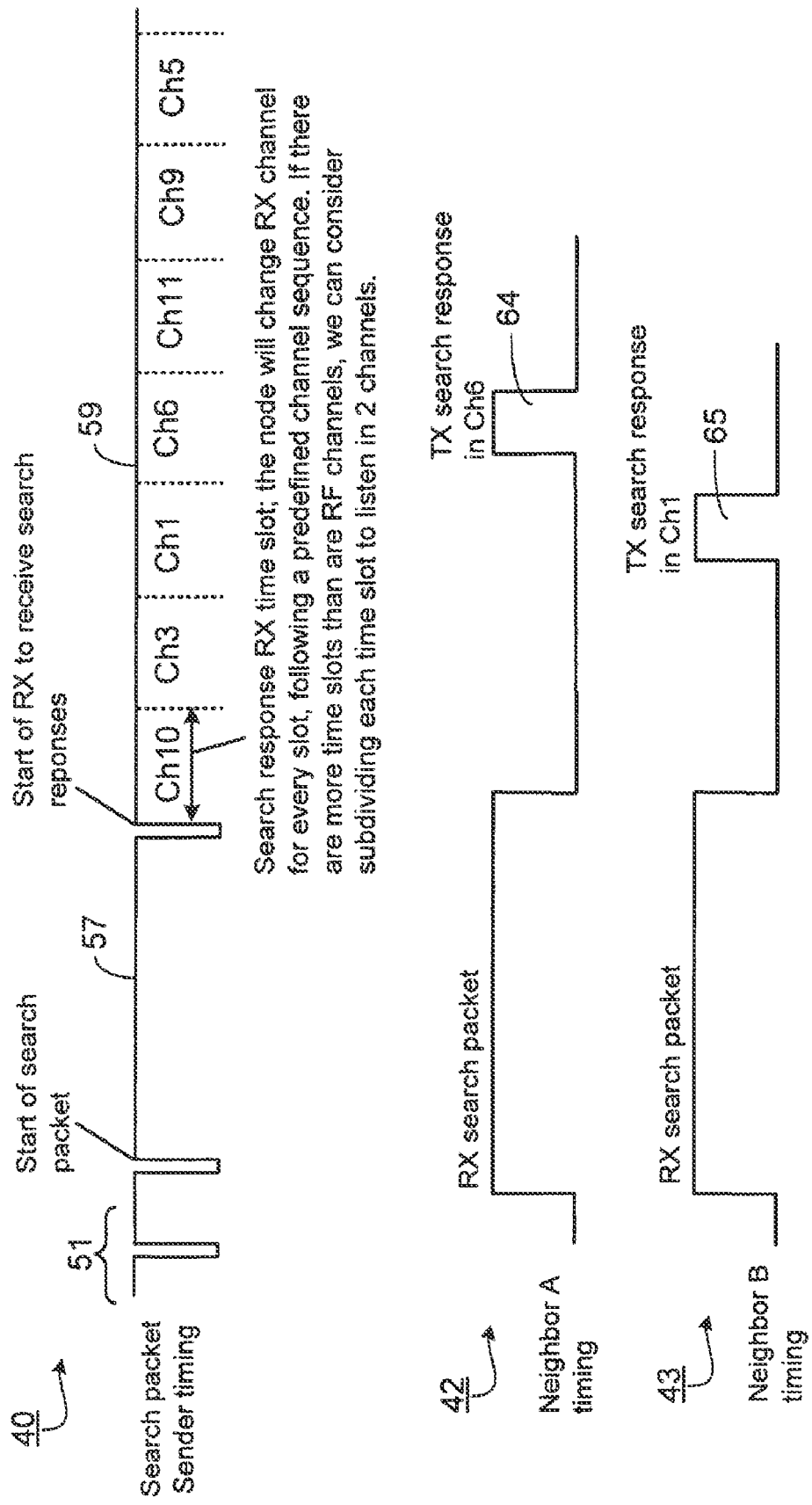
FIG. 7 shows timing diagrams depicting how neighboring nodes respond, at different times, to a search packet transmitted by a sending node.

In one implementation, the nodes of network 10 are each programmed to send their frequency hopping data at a random time during the listening mode of device 40. For example, each neighboring node may contain an algorithm that picks a random time during the listening mode to send its frequency hopping data. Sending data at random times reduces the possibility of a collision between frequency hopping data from different nodes. In the event of a collision, a node will not receive an ack packet back from device 40. In this case, the node re-sends its frequency hopping data at a different time. If device 40 is frequency hopping during the listening mode, its neighboring nodes must also take this into account when sending their frequency hopping data. This contingency is shown in FIG. 7, where node 42 sends its frequency hopping data at a first time 64 in channel 6 and node 43 sends its frequency hopping data at a second time 65 in channel 1.

It is noted that if all nodes use the same hopping sequence, wake-up times, and/or duty cycles, then all frequency hopping data need not be transmitted between nodes. For example, if all nodes on the network have the same duty cycle (and every node or potential node knows this), there is no need to transmit duty cycle data between nodes.

In order to reduce the amount of information that is exchanged between device 40 and its neighbors, device 40, and its neighboring nodes, may each store an algorithm, which receives a single "seed" number and which processes that seed number to generate a frequency hopping sequence. For example, device 40 may receive a seed number from neighboring node 42 and process that seed number to determine the sequence of frequencies through which node 42 hops to receive data. As a result, only a single number is transmitted instead of a whole sequence, thereby reducing network traffic.

In this regard, the frequency hopping channel should be selected from a specified set of channels as randomly as possible with a uniform distribution so that, on average, the device will spend about the same amount of time on each channel. A calculation may be performed iteratively to produce a new random number from each iteration. A seed number will generate the first random number, which corresponds to the first frequency channel. This first random number is fed into the calculation as the new seed number, which then generates a second random number, which corresponds to the second frequency channel. This process can continue indefinitely to select new channel during frequency hopping. In one implementation, the calculation is used to generate a random number that is 32-bits long in a binary representation. In this implementation, a single number between 1 and 16 is generated, and only the last 4-bits of this 32-bit random number are used. (In decimal representation the 32-bit long number can be divided by 16 and the remainder used—a modulus operation.) The 32-bit long random number is used as the new seed number I, every iteration so that it is less likely that the random sequence becomes periodical.

Numerous processes may be used to produce sequence of random numbers based on a seed number. The following code is an example from the book "*The C Programming Language*," by Kernighan and Ritchie for generating a sequence from a seed number:

```
int rand( )
{
    random_seed = random_seed * 1103515245 +12345;
    return (unsigned int) (random_seed / 65536) % 32768;
}
```

This function will return a random number between 0 to 32767, depending on the seed number. If the total number of channels is 16, it is possible to use the least significant four bits to generate a random number between 0 and 15. As described above, the first random number obtained from the seed number can replace the seed number in the foregoing process, which is then used to generate a next random number. Via this method, it is possible generate a full frequency hopping sequence of 16 channels using one seed number.

There may be a situation that multiple nodes powers-up exactly at the same time. For example, if the nodes are line-powered, and line power is restored after a power outage, all nodes connected to the same line power will turn on at the same time. In this case, there is a chance that the wake-up times and frequency channels may be exactly the same for all nodes. Although this scenario may be acceptable for certain applications, this is typically undesirable because it counteracts the asynchronous behavior of the proposed frequency hopping protocol to increase the overall communication capacity of the network. So, whenever a node powers up, the node may have a certain amount of random "dead time" before the node starts running. This way, it is unlikely that many nodes will share the same wake-up schedule and frequency channel.

It is advantageous if all neighboring nodes occupy different timing slots during frequency hopping. For example, frequency hopping can become more difficult when multiple listening slots of neighboring nodes are close. This is because some pre- and post-processing time may be necessary to send a packet to one node. For example, if node A's wake-up schedule is too close to that of node B, a neighboring node may have difficulty sending data packets to both nodes A and B. After a neighboring node (e.g., node C) sends a data packet to node A, it may need processing time to complete the transmission and to prepare a next data packet to send to node B. If the listening slots of node A and node B are too close in time, node C may not have enough time to prepare for the data transmission to node B. Furthermore, if two listening slots are too close together, it may not be practical for node C to enter its dormant mode and then wake up again in the short time between slots. In this case, it may be better for the node C to remain awake after sending the data packet to node A, and to wait for the listening slot of node B while awake.

One way to reduce conflict caused by close proximity of listening slots of multiple neighboring nodes is to adjust the initial wake-up schedules of those nodes following their activation (power-up). For example, when a node powers-up, it will send a search packet and collect information about its neighboring nodes, such as wake-up times, wake-up durations, and channel sequences. Accordingly, a node that is entering the network may select its own wake-up time after collecting information from neighboring nodes, and choose a wake-up time that reduces (e.g., minimizes) conflicts with neighboring nodes.

A device can consume a relatively large amount of power due to the length of its preamble. As a result, it is advantageous to reduce the amount of times a device must initiate communication using the preamble. One way of doing this is to "piggy-back" node frequency hopping (and other) data. Referring to FIG. 2, node 42 stores the frequency hopping data for its neighbors, including those that are out of the transmission range of device 40, such as node 28. Accordingly, when transferring its frequency hopping data during the listening mode of device 40, node 42 may also transfer, to device 40, the frequency hopping data of node 28, along with the identity of node 28 (which device 40 then stores in memory). Thus, device 40 will also receive the frequency hopping data of node 28. This is particularly advantageous if device 40 or node 28 can come within transmission range of each other (e.g., if one or both is mobile). This concept can be extended. For example, node 28 stores the frequency hopping data for its neighbors, including those that are out of the transmission range of node 42, such as node 26. Node 28 may transmit this frequency hopping data to node 42, along with its own frequency hopping data. Node 42 may then transfer, to device 40, the frequency hopping data of two other nodes, one of which (node 26) is outside the transmission range of node 42.

Figure 8:
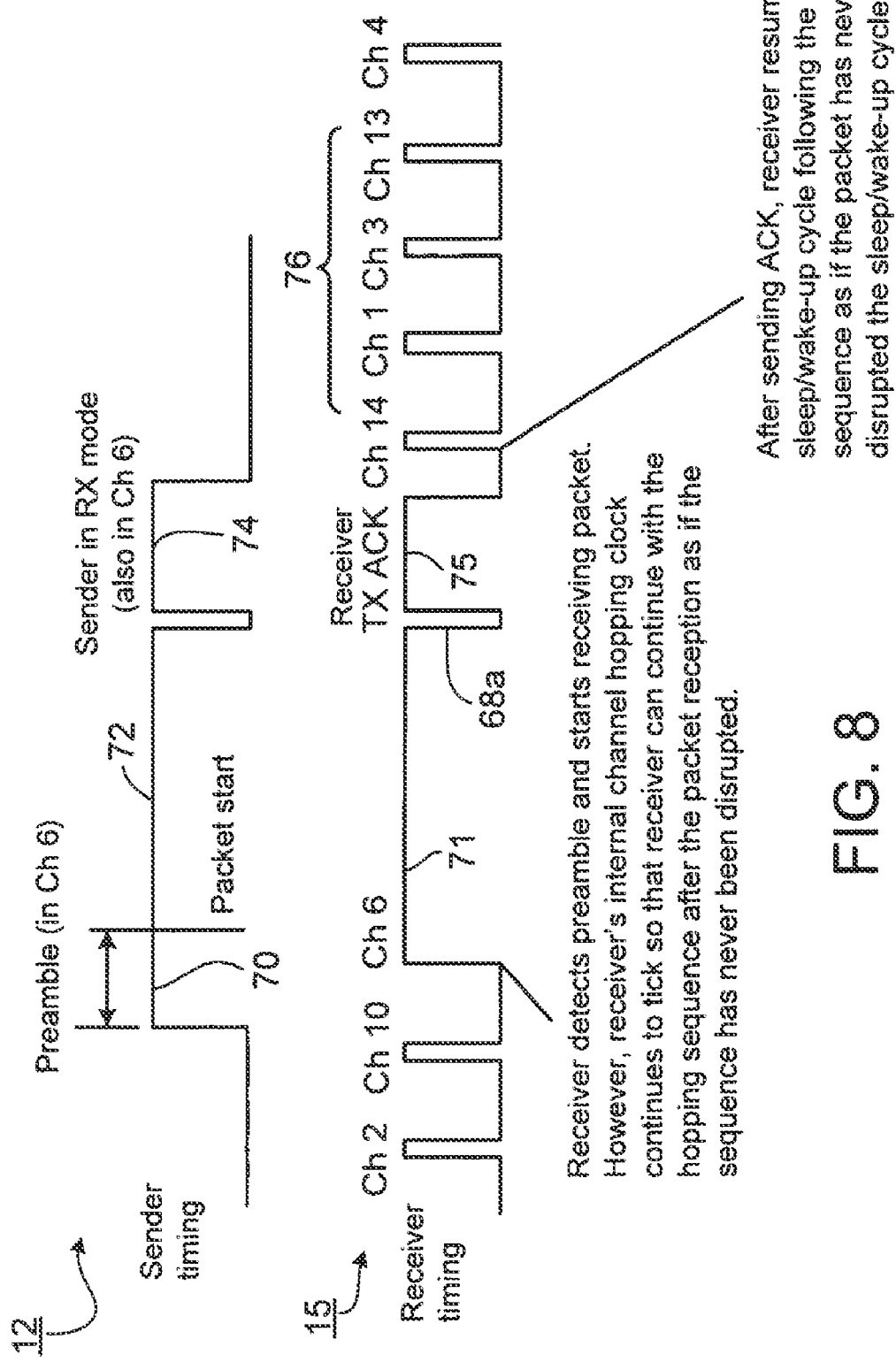
FIG. 8 shows timing diagrams depicting use of a preamble during the normal course of operation of two network nodes, particularly where a device's receiving duration is short.

The use of preambles may be extended to normal node communication in order to increase the duty cycle of network node (e.g., by increasing the waking durations of the nodes). Referring to FIGS. 1 and 8, if the receiving node (e.g., node 15) has a relatively short waking duration, it may be difficult for the sending node (e.g., node 12) to match its transmission to that short waking duration. For example, a relatively short time shift in the internal clock of the sending node may effectively prevent the sending node from communicating with the receiving node (if the receiving node's waking duration is sufficiently short). To address this problem, the sending node may output a relatively short preamble (e.g., 5 ms or 10 ms) in the appropriate channel prior to the expected waking duration of the receiving node.

In the example shown in FIG. 8, the sending node outputs a preamble 70 in channel 6 following the receiver's waking time in channel 10. The receiving node detects the preamble during its receiving duration in channel 6 and extends its receiving duration 71, as shown. During this extended receiving duration, sending node 12 sends a data packet 72 to the receiving node in channel (Ch) 6. When the receiving node detects an "end-of-frame" indication in the data packet, the receiving node ends the extended receiving duration 71 at 68a. Thereafter, the sending node goes into receiving mode 74 to receive an ack packet 75 from the receiving device. It is noted, however, that the internal channel hopping clocks of both devices continue to run so that the devices can resume their frequency hopping sequence 76 (after the extended receiving duration) as if that sequence were never interrupted.

An alternative to the timing shown in FIG. 8 is to make a whole data packet fit into a single MN_sleep_time of the receiving device. The preamble is thus long enough to cover an MN_RX_time. Accordingly, the frequency hopping sequence need not be disturbed.

As noted above, in 900 MHz radio operation, the FCC limits communication in a single channel to 400 ms with a narrow-band radio. There is no limit on the duration of a continuous communication in a single channel if DSSS (Direct Sequence Spread Spectrum) is used. However, there are very few 900 MHz commercial radios that have this capability. By contrast, in 2.4 GHz operation, there are many standard-based radios (e.g. IEEE IEEE802.15.4) available with DSSS capabilities. Therefore, if a preamble is to be longer than 400 ms during 900 MHz operation, then the preamble may be transmitted in multiple frequencies. This is referred to herein as "channel grouping".

As noted above, there is an FCC regulation that prohibits a multi-channel narrow-band (e.g., 900 MHz) radio from staying in one frequency channel for longer than 400 ms using FHSS (Frequency Hopping Spread Spectrum). Accordingly, in this limited circumstance, it is not legal for a preamble to stay in one channel for more than 400 ms. To deal with this issue, a preamble that is longer than 400 ms may be divided into multiple sections and transmitted in different frequency channels in the 900 MHz spectrum. For example, a 1.5 s preamble may be split into four (or more) segments, which may be of equal or non-equal length. When one segment of the preamble completes transmission in a first frequency channel, a node transmitting the preamble changes the frequency channel and continues transmission of the preamble in a new frequency channel. This is done until the entire 1.5 s preamble is transmitted, without violating FCC regulations.

For the reasons explained above, at least one listening slot of each neighboring node should be covered by the preamble, even though the preamble is being transmitted multiple channels. To achieve this, a process called "channel grouping" may be used.

By way of example, a preamble may be transmitted in N different channels so that each channel includes no more than 400 ms of preamble. In this case, existing frequency channels may be divided into N groups. For example, if the preamble 1.4 s, it may be divided into four segments. In this case, N=4. If there are 16 channels available, the channels may be divided into four groups with four channels per group. In another example, if the preamble is 700 ms, the preamble may be divided into two segments and there may be two channels per group (assuming eight channels are available).

While a node is hopping frequency channels to listen for communications, the channel sequence of the node follows a group order. In other words, once the node starts hopping in a channel that is in a first group, group 1, a next hopping channel may be selected from the same group 1 until group 1 runs out of channels. After the node has hopped through all channels in group 1, the node starts hopping among the channels in a second group, group 2, and so on. For example, group 1 may include channel 1 to channel 10 and group 2 may include channel 11 to channel 20. In this case, the sequence should be defined so that channels 1 through 10 are selected first, followed by channels 11 to 20.

The preamble, however, hops only inside one group. For example, if the node transmitting the preamble selects group 2, the preamble should hop only inside group 2. (e.g., among channel 11 to 20). Since the preamble include N segments, each group should include at least N channels. This means that total number of available RF channels should be larger than N×N. This is because a preamble with N segments needs N groups of channels, and each group needs to include minimum of N channels.

Using the foregoing process, there is a good chance that a preamble, although transmitted in multiple channels, can be captured by at least one listening channel of a neighboring node. But, there is a non-negligible chance (approximately (N−1)/total number of channels) that the preamble will be missed by one or more neighboring nodes. However, the probability of a neighboring node failing to capture the preamble decreases as the total number of channels increases. For example, if the preamble is at least 1.5 s, the preamble will hop through at least 4 channels (N=4) so that each channel is occupied no more than 400 ms. Hence, the total number of available channels should be greater than or equal to 16 (N×N=4×4=16). Of course, this may only apply when each channel is a narrow-band (e.g., 900 MHz) channel. In the case of 2.4 GHz DSSS radios, such as IEEE802.15.4 standard-based radios, channel grouping is not necessary, but may also be used.

One exemplary implementation of the frequency hopping protocol uses the CC2420 transceiver from Chipcon Products. As described on the Chipcon Products Web site, "[t]he CC2420 is a low-cost transceiver designed specifically for low-power, low-voltage RF applications in the 2.4 GHz unlicensed ISM band." In this example, a whole packet (not just a byte) constitutes a unit of the preamble. In this case, each preamble unit is approximately 1 ms. Accordingly MN_RX_time is at least 2× the preamble unit size, or 2 ms. To achieve 100× power savings, MN_sleep_time should be about 200 ms. The CC2420 provides sixteen channels. The minimum preamble length that can cover all sixteen channels is 3.2 s (200 ms*16 channels). Since the CC2420 operates in the 2.4 GHz range with DSSS capability, there is no limit on the maximum time the CC2420 can stay in one channel. So, the preamble can stay in the same channel for any length of time.

Alternatively, the preamble may be split among two to four channels. That is, the preamble may be transmitted in different frequency channels.

For ordinary packet transmission, where there is one known packet destination, if the time synchronism is sufficiently accurate (accuracy of ~1 ms), the start of a data packet can be fit into the MN_RX_time (~2 ms) window of a receiving device. The SFD will be detected by the receiving device before MN_RX_time expires, and the MN_RX_time will be elongated until packet reception is complete. If the time synchronism is less accurate or the SFD is not available from the radio, several short preamble packets (e.g., IEEE802.15.4 packets) may precede the real data packet. This stream of short preamble packets may include five to ten short IEEE802.15.4 packets (~1 ms/packet). The result will be a preamble of about 10 ms, which will enable the 2 ms MN_RX_time window to capture at least one preamble packet even if there is ±5 ms clock drift. Once the receiver identifies the preamble packet(s) in the MN_RX_time window, the receiver will continue listening in the same frequency channel (as described above) in order to receive the real (i.e., non-preamble) data packet. In this example, ack packets are sent on a next hop channel after regular packet transmission. Alternately, ack packets may be sent on the same channel as regular data packet transmission.

Clock drift may be an issue when the interval between packet exchanges becomes quite long. To alleviate clock drift, each node of a wireless network sends a local "heartbeat packet" to each of its parent nodes (primary, and secondary, and so on) in a given interval. For example, if the clocks of neighboring nodes must be adjusted every 40 seconds to keep the drift in the acceptable range, the local heartbeat may be generated, and sent to each parent node, at least every 40 seconds. If a data packet is sent out to a parent node, the data packet may act as a replacement for the local heartbeat packet The frequency hopping protocol may be used when a device enters into a network and when a device broadcasts over the network. That is, during broadcast, a device needs to get the attention of all of its neighbors. Since the neighbors may be in different frequencies, sending a preamble and proceeding in the manner described above enables a device to broadcast information to its neighbors, who then may propagate that information to their neighbors using the frequency hopping protocol, and so on until every node on the network has received the information.

Network Device

Figure 9A:
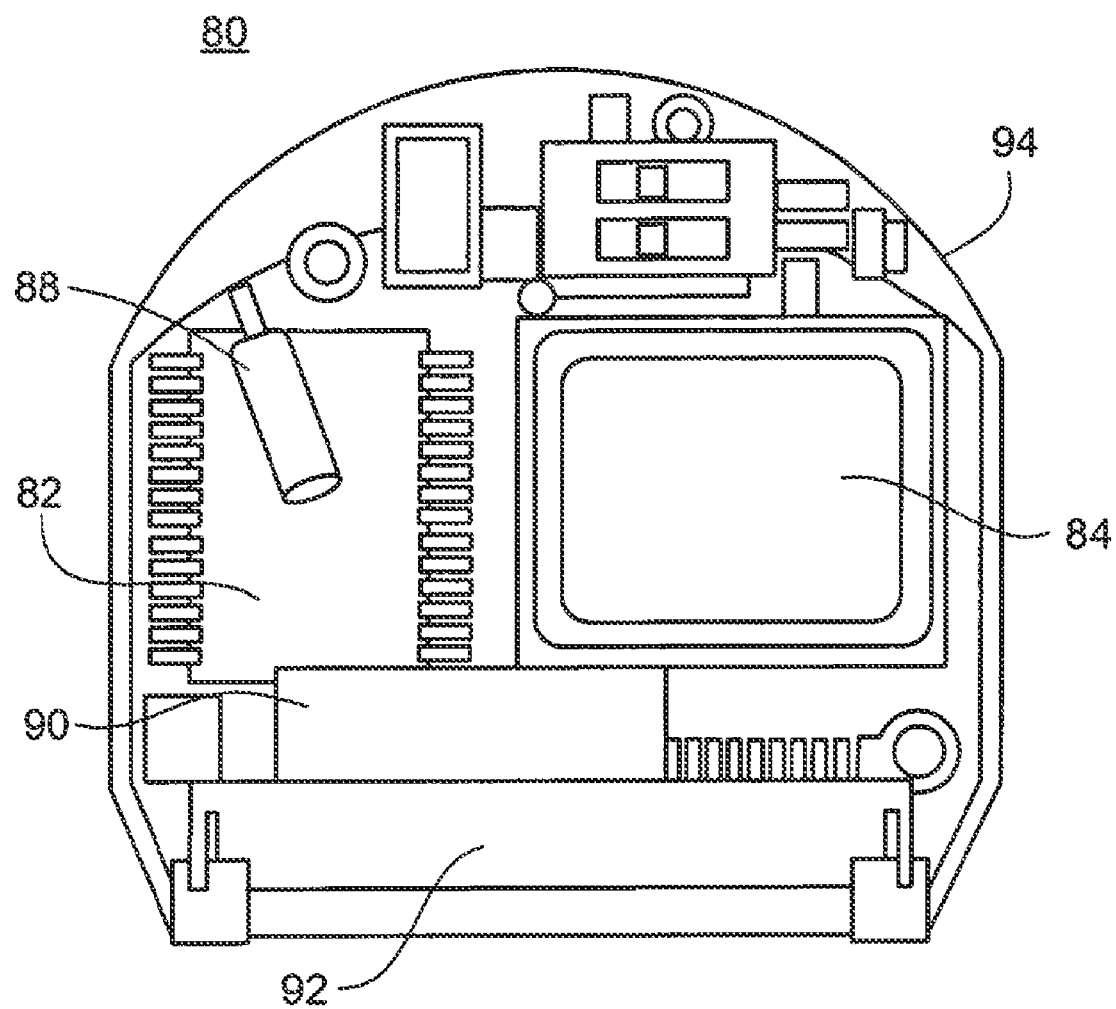
FIGS. 9A to 9C show examples of devices on the wireless network of FIG. 1 or 2 that may implement the frequency hopping protocol.
Figure 9B:
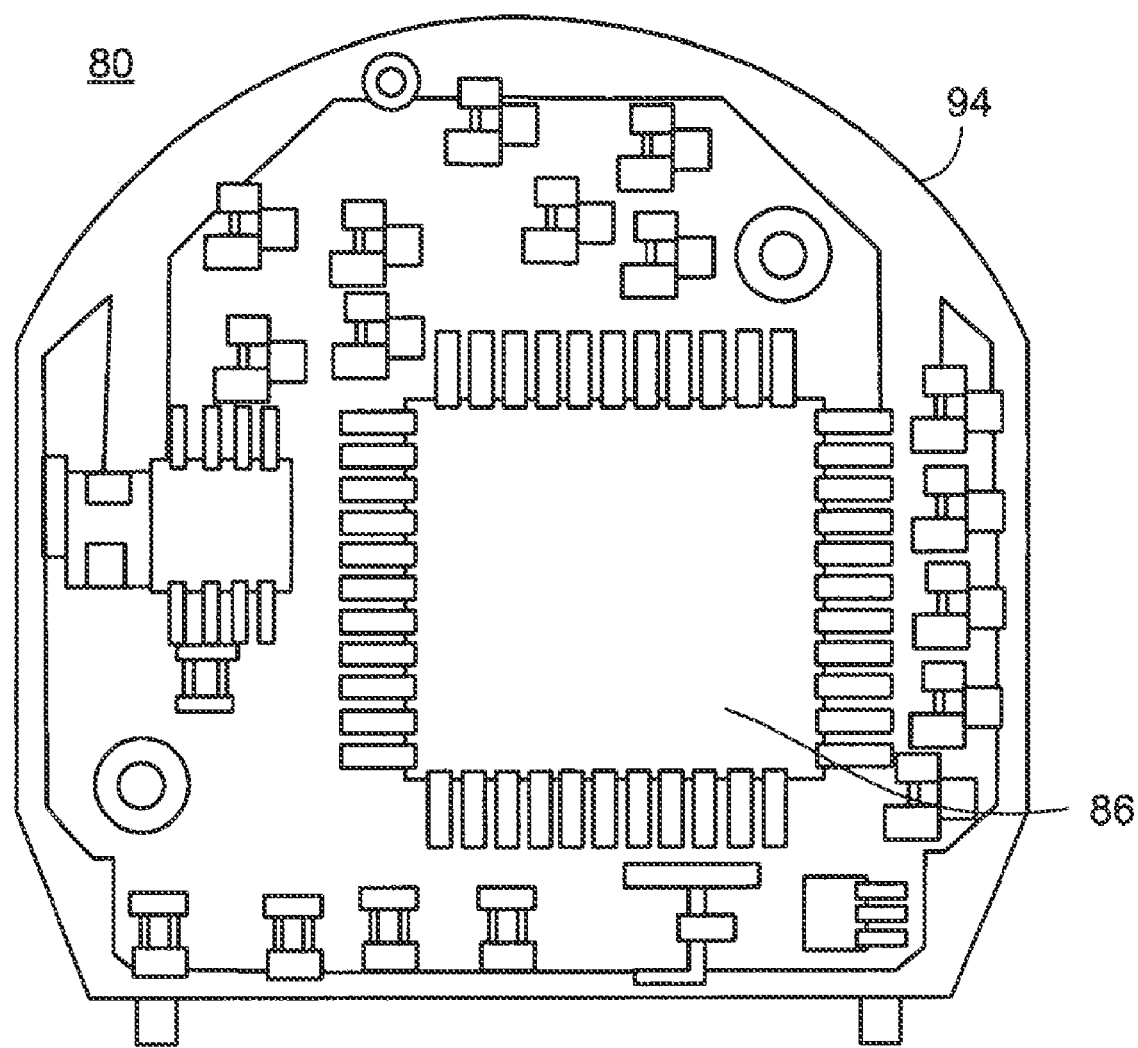
Figure 9C:
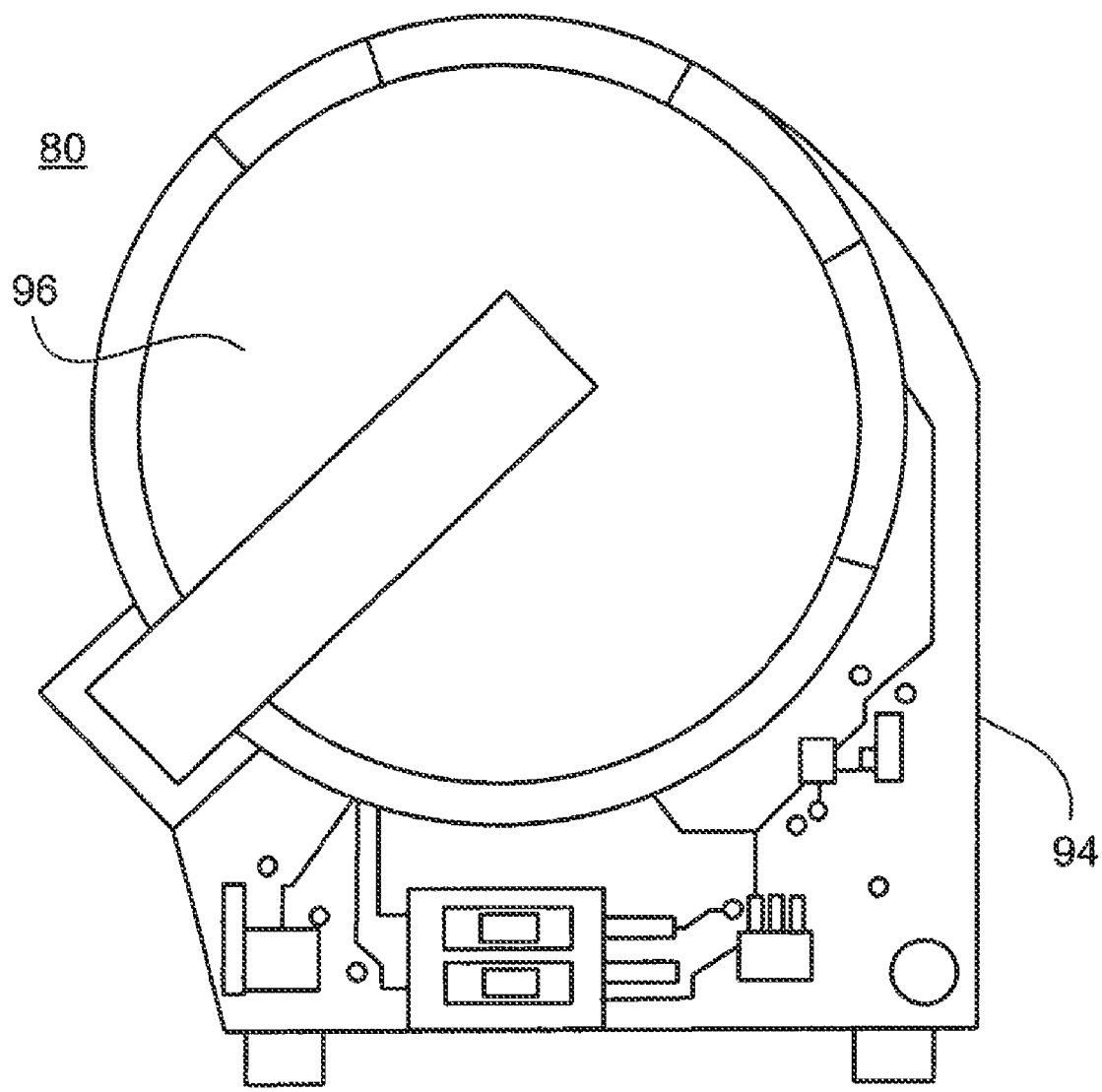

Examples of network devices that may be used as nodes of wireless network 10, and that may implement the processes described herein, are described in U.S. Pat. No. 6,804,790, which issued on Oct. 12, 2004, the contents of which are hereby incorporated by reference into this application. FIGS. 9A to 9C show block diagrams of one example of a network device 80 that may implement the processes described herein.

Network device 80 is a self-contained, miniaturized computer. As shown in FIGS. 9A and 9B, network device 80 includes first processing unit 82, RF transceiver 84, second processing unit 86, low clock frequency crystal 88, high clock frequency crystal 90, and I/O connector 92, all mounted on circuit board 94. As shown in FIG. 9C, a power source 96, such as a battery, may be attached to the back of circuit board 94. A memory containing instructions to be executed by each processing unit may be included inside each processing unit or one or more such memories (not shown) may be mounted on circuit board 94.

The small size and low power consumption of network device 80 allows network device 80 to operate from battery 90. In this implementation, first processing unit 82 operates at a clock frequency of 32 kHz, and second processing unit 86 operates at a clock frequency of 4 MHz. A coordinating protocol operates so that network device 80 may perform signal processing and RF transmission with increased power efficiency.

The coordinating protocol is used to control the operation of network device 80 by assigning tasks and operations to the processing units based upon the speed required to perform a given task of function. The coordinating protocol is designed to assign tasks to the various processing units with the result being increased power efficiency on network device 12. For example, the coordinating protocol will allow CPU 82 to assign a given task or operation (such as joining or establishing a presence in wireless network 10) to itself or to CPU 86 based upon the speed requirements of the task or operation and the clock frequencies of the processing units. Tasks and operations which require lower clock frequencies will be assigned to CPU 86 with the lower clock frequency. Because CPU 86 operates at lower clock frequency, the power efficiency of the system as a whole is increased. When the task load of the system is low enough, the CPUs may be shut-off or placed into low-power mode to further increase the power efficiency of the system.

Other Implementations

The processes described herein including, but not limited to, the frequency hopping protocol (hereinafter referred to collectively as "the processes") may find applicability in any computing or processing environment. The processes may be implemented using hardware, software, or a combination thereof. The processes are not limited to use with the hardware and software described herein; they may find applicability in any computing, processing or networking environment and with any type of machine that is capable of executing machine-readable instructions.

The processes may be implemented using digital electronic circuitry, or in computer hardware, firmware, software, or in combinations thereof. The processes can be implemented via a computer program product, i.e., a computer program tangibly embodied in an information carrier, e.g., in one or more machine-readable storage devices/media or in a propagated signal, for execution by, or to control the operation of, one or more data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions performed by the processes can be performed by one or more programmable processors executing one or more computer programs to perform the functions of the processes. The actions can also be performed by, and the processes can be implemented via, special purpose logic circuitry, e.g., one or more FPGAs (field programmable gate array) or ASICs (application-specific integrated circuit).

Processors suitable for execution of a computer program include, e.g., both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The processes can be implemented via a computing system that includes one or more back-end components, e.g., a data server, or that includes one or more middleware components, e.g., an application server, or that includes one or more front-end components, e.g., a client computer. The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The processes are not limited to the implementations described. For example, the processes can be used with network devices other than those shown in 9A to 9C. Any computer, router, server, wireless device, or similar machine may implement the processes. The processes can be used on homogeneous networks as well. The processes can be used with networks having configurations other than those shown in FIGS. 1 and 2, including networks that have both wired and wireless portions. The processes are not limited to use with the protocols and data transmission methods described herein, but rather are universally adaptable.

The processing described herein may be performed in a different order and/or portions thereof may be omitted. As such, operations performed in furtherance of the processes are not limited to the flows described herein.

Elements of different implementations may be combined to form another implementation not specifically set forth above. Other implementations not specifically described herein are also within the scope of the following claims.

What is claimed is:

1. A method for communicating with a wireless network comprised of nodes that are active for predefined activation times and that are at least partially dormant when not active, the method comprising:
   generating, by a second device, first information based on a first time base of the second device, the first information indicates when to communicate with the second device;
   generating, by a third device, second information based on a second time base of the third device, the second information indicates when to communicate with the third device;
   identifying, by a first device, a start of communication via a first message that exceeds a maximum activation time of nodes on the wireless network by a factor N, where N is equal to at least a maximum number of frequencies configured for the wireless network, and the first message transmitted from the first device;
   transmitting, by the second device, the first information to the first device;
   receiving, by the first device, the first information transmitted from the second device, wherein the second device comprising a node on the wireless network that is within a transmission range of the first device, and the first information is received following the first message and is generated by the second device;
   transmitting, by the first device, a first communication to the second device based on the first information which indicates when to communicate with the second device;
   transmitting, by the third device, the second information to the first device or the second device;
   receiving, by the first device or the second device, the second information transmitted from the third device, and the second information is generated by the third device; and
   transmitting, by the first device or the second device, a second communication to the third device based on the second information which indicates when to communicate with the third device.

2. The method of claim 1, wherein the first information exchanged following the first message includes sequence data, wake-up data, and duty cycle data for the first device.

3. The method of claim 1, wherein the first information is received over multiple frequencies through which the first device hops following the first message, the multiple frequencies being following the first message.

4. The method of claim 1, wherein the first information includes first sequence data, first wake-up data, and first duty cycle data for the second device and the first sequence data, the first wake-up data, and the first duty cycle data is generated by the second device and the second information includes second sequence data, second wake-up data, and second duty cycle data for the third device, the second sequence data, the second wake-up data, and the second duty cycle data generated by the third device.

5. A method for use in conjunction with a wireless network, the method comprising:
   generating, by a second device, first information based on a first time base of the second device, the first information indicates when to communicate with the second device;
   generating, by a third device, second information based on a second time base of the third device, the second information indicates when to communicate with the third device;
   outputting, by a first device, a preamble to the wireless network, the preamble containing time data corresponding to a duration of the preamble;
   identifying, by the first device, one or more listening frequencies of the first device that follow the preamble, the one or more listening frequencies comprising one or more frequency bands at which the first device activates;
   transmitting, by the second device, the first information to the first device in the one or more listening frequencies;
   receiving, by the first device, the first information from the second device in the wireless network and in the one or more listening frequencies, the first information generated by the second device, the first information corresponding to times at which the second device activates;
   storing, by the first device, the first information;
   transmitting, by the first device, a first communication to the second device based on the first information which indicates when to communicate with the second device;
   transmitting, by the third device, the second information to the first device or the second device;
   receiving, by the first device or the second device, the second information from the third device in the wireless network, the second information generated by the third device, the second information corresponding to times at which the third device activates; and transmitting, by the first device or the second device, a second communication to the third device based on the second information which indicates when to communicate with the third device.

6. The method of claim 5, further comprising outputting, to the second device by the first device, a search packet, the search packet being output following the preamble and before receiving the first information from the second device, the search packet identifying the first device and containing third information for the first device.

7. The method of claim 5, wherein the wireless network comprises N (N>2) devices including the second device, each of the N devices being configured to activate at a frequency in a sequence of M (M>1) frequencies, the N devices activating for time intervals, one of the N devices having a maximum activation time interval of T, the preamble having a time duration that is at least a product of M*T.

8. The method of claim 5, wherein the one or more listening frequencies comprise a single listening frequency, the single listening frequency being a same frequency at which the preamble is output.

9. The method of claim 5, wherein the one or more listening frequencies comprise multiple listening frequencies, the search packet identifying sequence data and duty cycle data for the multiple listening frequencies.

10. The method of claim 5, wherein the first information comprises a single number, the first device generating the sequence of frequencies at which the second device activates by processing the single number using a predefined algorithm.

11. The method of claim 5, further comprising:
receiving, by the first device, third information, for the third device in the wireless network from the second device, the third information generated by the third device, and in the one or more listening frequencies, wherein the third device is not within a wireless transmission range of the first device.

12. The method of claim 5, further comprising:
sending, by the first device, a third communication to the second device using the first information;
wherein sending the third communication comprises:
sending, by the first device, a second preamble, the second preamble being sent at about a time specified in the first information;
receiving, by the first device, an acknowledgement signal from the second device in response to the second preamble; and
sending, by the first device, information for the third communication following the second preamble and in response to the acknowledgement signal, the information being sent in a same frequency as the second preamble.

13. The method of claim 5, wherein the preamble comprises a series of data packets transmitted in sequence, the data packets containing the time data from which the duration of the preamble can be determined.

14. The method of claim 5, further comprising:
sending, by the first device, a fourth communication to the second device using the first information;
wherein sending the fourth communication comprises:
sending, by the first device, a second preamble, the second preamble being sent at about a time specified in the first information;

sending, by the first device, information for the fourth communication following the second preamble, the information being sent in a same frequency as the second preamble; and
receiving, by the first device, an acknowledgement signal from the second device in response to the information for the fourth communication.

15. The method of claim 5, wherein the first information includes first sequence data, first wake-up data, and first duty cycle data and the second information includes second sequence data, second wake-up data, and second duty cycle data.

16. The method of claim 5, wherein the first information being usable to obtain a sequence of frequencies at which the second device activates and being based on durations of time for which the second device sleeps and the second information being usable to obtain a sequence of frequencies at which the third device activates and being based on durations of time for which the third device sleeps.

17. A device comprising:
memory configured to store instructions that are executable; and
at least one processor configured to execute the instructions to:
enter an activation mode to communicate over a wireless network; and
enter a dormant mode periodically, the at least one processor performing fewer tasks in the dormant mode than in the activation mode;
wherein to configure the device for communication or broadcast over the wireless network, the at least one processor executes instructions to:
output, by the device, a preamble to the wireless network, the preamble containing time data corresponding to a duration of the preamble;
identify, by the device, one or more listening frequencies of the device that follow the preamble, the one or more listening frequencies comprising one or more frequency bands at which the device enters the activation mode following the preamble;
receive, by the device, first information from a node in the wireless network and in the one or more listening frequencies, the first information generated by the node based on a first time base of the node, the first information corresponding to times at which the node activates and indicates when to communicate with the node;
store, by the device, the first information;
transmit, by the device, a first communication to the node based on the first information which indicates when to communicate with the node;
receive, by the device, second information from a second node in the wireless network and in the one or more listening frequencies, the second information generated by the second node based on a second time base of the second node, the second information corresponding to times at which the second node activates and indicates when to communicate with the node;
store, by the device, the second information; and
transmit, by the device, a second communication to the second node based on the second information which indicates when to communicate with the second node.

18. One or more non-transitory machine-readable media for storing instructions that are executable by a first device for use with a wireless network, the instructions to:

output, by the first device, a preamble to the wireless network, the preamble containing time data corresponding to a duration of the preamble;

identify, by the first device, one or more listening frequencies of the first device that follow the preamble, the one or more listening frequencies comprising one or more frequency bands at which the first device activates;

receive, by the first device, first information from a second device in the wireless network and in the one or more listening frequencies, the first information generated by the second device based on a first time base of the second device, the first information corresponding to times at which the second device activates and indicates when to communicate with the second device;

store, by the first device, the first information;

transmit, by the first device, a first communication to the second device based on the first information which indicates when to communicate with the second device;

receive, by the first device, second information from a third device in the wireless network and in the one or more listening frequencies, the second information generated by the third device based on a second time base of the third device, the second information corresponding to times at which the third device activates and indicates when to communicate with the third device;

store, by the first device, the second information; and transmit, by the first device, a second communication to the third device based on the second information which indicates when to communicate with the third device.

19. A method, performed by a node in a wireless network, comprising:

generating, by the node, first information based on a first time base of the node, the first information indicates when to communicate with the node;

receiving, by the node, a preamble from a device, the preamble containing time data corresponding to a duration of the preamble;

identifying, by the node, one or more listening frequencies of the device that follow the preamble, the one or more listening frequencies comprising one or more frequency bands at which the device activates;

sending, by the node, the first information to the device and in the one or more listening frequencies, the first information for the device generated by the node, the first information corresponding to times at which the node activates;

receiving, by the node, a first communication from the device based on the first information which indicates when to communicate with the node;

receiving, by the node, second information from a second node and in the one or more listening frequencies, the second information for the second node generated by the second node based on a second time base of the second node, the second information corresponding to times at which the second node activates and indicates when to communicate with the second node; and transmitting, by the node, a second communication to the second node based on the second information which indicates when to communicate with the second node.

20. The method of claim 19, wherein the first information are sent at a time that is obtained to reduce conflict with other nodes sending data to the device following the preamble.

21. A system comprising:

a wireless network comprised of plural nodes, at least some of the nodes having an activation time during which the at least some nodes are active;

a first device configured to:
transmit a message that exceeds a maximum activation time of nodes on the wireless network by a factor N, where N is equal to at least a maximum number of frequencies configured for the wireless network and the message identifies a start of communication,
receive first information from a second device and second information from a third device in response to the message,
transmit a first communication to the second device based on the first information which indicates when to communicate with the second device, and
transmit a second communication to the third device based on the second information which indicates when to communicate with the third device;

a second device comprising a node on the wireless network, the second device being configured to:
generate the first information based on a first time base of the second device, the first information indicates when to communicate with the second device,
transmit the first information in response to the message, the first information identifying how the second device performs frequency hopping to receive data, and the first information generated by the second device, and
receive the first communication from the first device based on the first information; and a third device comprising a second node on the wireless network, the third device being configured to:
generate the second information based on a second time base of the third device, the second information indicates when to communicate with the third device,
transmit the second information in response to the message, the second information identifying how the third device performs frequency hopping to receive data, and the second information generated by the third device, and
receive the second communication from the first device based on the second information.

22. The system of claim 21, wherein the first devices identifies one or more frequencies that follow the message, the second device being configured to transmit a response to the message in the one or more frequencies, wherein a response to the message by the second device is timed to reduce conflict with possible messages from other devices on the wireless network.

23. The system of claim 21, wherein the message comprises a preamble containing time data corresponding to a duration of the preamble, and one or more listening frequencies of the first device follow the preamble, the one or more listening frequencies comprising one or more frequency bands at which the first device activates;

wherein the second device is configured to transmit the response to the message in the one or more listening frequencies; and wherein the first information corresponding to times at which the second device activates.

24. A system for communicating via a wireless network, the system comprising:

a first device configured to:
transmit a preamble to the wireless network, the preamble containing time data corresponding to a duration of the preamble,
receive first information from a second device and in one or more listening frequencies, the first information corresponding to times at which the second device activates, receive second information from a third device and in one or more listening frequencies, the second information corresponding to times at which the third device activates,
store the first information,
store the second information,
transmit a first communication to the second device based on the first information which indicates when to communicate with the second device, and
transmit a second communication to the third device based on the second information which indicates when to communicate with the third device;

the second device configured to:
receive the preamble from the first device,
identify the one or more listening frequencies of the first device that follow the preamble, the one or more listening frequencies comprising one or more frequency bands at which the first device activates,
generate, by the second device, the first information for being received by the first device based on a first time base of the third device, the first information indicates when to communicate with the second device, and
transmit the first information to the first device and in the one or more listening frequencies, and the third device configured to:
receive the preamble from the first device,
identify the one or more listening frequencies of the first device that follow the preamble, the one or more listening frequencies comprising one or more frequency bands at which the first device activates,
generate, by the third device, the second information for being received by the first device based on a second time base of the third device, the second information indicates when to communicate with the third device, and
transmit the second information to the first device.

25. The system of claim 24, the system further comprising:
the second device further configured to activate and receive the first communication based on the first information.

* * * * *